United States Patent [19]

Froehling et al.

[11] Patent Number: 4,497,031

[45] Date of Patent: Jan. 29, 1985

[54] DIRECT DIGITAL CONTROL APPARATUS FOR AUTOMATED MONITORING AND CONTROL OF BUILDING SYSTEMS

[75] Inventors: Paul H. Froehling, Franklin; Jude R. Anders, Glendale; Lawrence J. Strojny, Muskego; James M. Rehberger, Caledonia, all of Wis.

[73] Assignee: Johnson Service Company, Milwaukee, Wis.

[21] Appl. No.: 401,632

[22] Filed: Jul. 26, 1982

[51] Int. Cl.³ .............................................. G06F 15/20
[52] U.S. Cl. .................................... 364/505; 364/557; 165/14; 165/22
[58] Field of Search ............... 364/505, 506, 557, 551, 364/413, 418, 492, 493; 165/22, 11 R, 48, 50, 13, 14; 236/46 R

[56] References Cited

U.S. PATENT DOCUMENTS

| | | | |
|---|---|---|---|
| 3,716,096 | 2/1973 | Berrett et al. | 364/413 X |
| 4,034,801 | 7/1977 | Bernstein | 364/557 X |
| 4,064,485 | 12/1977 | Leyde | 340/147 R |
| 4,215,408 | 7/1980 | Games et al. | 364/505 |
| 4,217,646 | 8/1980 | Caltagirone et al. | 364/505 X |
| 4,234,926 | 11/1980 | Wallace et al. | 364/551 |
| 4,332,013 | 5/1982 | Chelcum et al. | 364/505 |
| 4,373,662 | 2/1983 | Bassett et al. | 364/505 X |

*Primary Examiner*—Edward J. Wise
*Attorney, Agent, or Firm*—Larry L. Shupe; Joseph J. Jochman, Jr.; John Phillip Ryan

[57] ABSTRACT

A low level, microprocessor based direct digital system controller includes power supply means for providing a source of regulated electrical power to the controller. A field programmable processor means transfers selected data base information to and receives status signals from a field interface means, digitally executes control and energy management algorithms respecting those signals in accordance with computer program routines selected from a library of mnemonically identified routines residing in the read only memory (ROM) portion of the processor means. The processor means responsively directs programmed data and digital command signals to the field interface means which periodically updates the data base of the processor means, analyzes and conditions signals received therein from the processor means and from remote data points and selectively controls the data points. An operator panel means having information display means is coupled to the processor means for displaying and adjusting selected system operating functions. An optional field termination board facilitates connection of external wiring to the controller.

40 Claims, 24 Drawing Figures

DIRECT DIGITAL CONTROL APPARATUS FOR AUTOMATED MONITORING AND CONTROL OF BUILDING SYSTEMS

BACKGROUND OF THE INVENTION

The present invention relates to a computerized process monitoring and control system and more particularly to a low level field programmable microprocessor-based system controller for providing control and energy management functions relative to a building heating, ventilating and air conditioning system.

Automated networks are widely employed in building environmental control systems for interconnecting remotely located heating, ventilating and air conditioning equipment, commonly termed HVAC equipment, with a central station to provide optimum comfort for the building occupants and for energy conservation. Hierarchical architecture is used to form such networks which are comprised of a main computer linked to lower level units by electrical trunk conductors. These trunk conductors may be of the dedicated type or may comprise conductors simultaneously used for other purposes such as telephone communications or the transmission of electrical power. Processing of the control and monitoring data and generation of command signals and the like advantageously employs computers which can rapidly and accurately service a large number of remote equipment units. For example, computers have been employed in heating, ventilating and air conditioning systems to monitor and regulate the positions of damper and valve actuators for controlling airflow and fluidflow in air handling units and to monitor the signal values of temperature and humidity sensors and regulate their related set points. Generally, such systems employ a main computer as a central processing unit having operator display and manual control functions as well as computational and command-generating capabilities. Additionally, the central processing unit embodies a library of computer software programs arranged in a relatively complex programmer language for providing energy management functions as, for example, temperature set back in office buildings during evening and weekend hours and for the limiting of total load demand. These central processing units are commonly termed headend units and are connected at the first or highest hierarchical level in a building automation system. Such headend units are often adapted to control and/or monitor several hundred or even several thousand individual datum points within the building system. The position of actuators used for damper and valve positioning and the output signals of temperature and humidity sensors used for providing feedback data relating to those parameters are examples of such datum points. Known systems or subsystems generally useful in the control of a building environment are shown in U.S. Pat. Nos. 3,400,374; 3,845,472, 4,042,780 and 4,159,470.

In addition to the central processing unit, such automated networks often employ a plurality of second level data processing units connected to the headend unit for performing certain tasks which would otherwise be required to be performed by the latter. As an example, a data processing unit may perform information checking functions with respect to signals passing between data points and the headend unit. Such data checking may include, for example, the detection of alarm signals or the detection of temperature changes which exceed predetermined values.

Each data processing unit may, in turn, have a plurality of third level field processing units coupled to it for performing analog to digital conversion and limited processing functions. Each field processing unit typically has connected in relatively close proximity thereto one or two sets of equipment having a relatively small number of individual datum points. Air handling units and water chillers are examples of such equipment. A variant field processing unit has limited standalone capability in that it incorporates software programming embodying default parameters which are activated only in the event the headend unit is disabled or in event of a trunk line fault, for example.

Air handling units, one of several types of environmental equipment to be monitored and controlled by a field processing unit, include ducts for controlling air flow to a conditioned space and heating and chilling coils disposed within the ducts for regulating the temperature of air being introduced into the space. Air handling units typically employ pneumatically or electrically actuator-operated shutters or dampers for controlling the flow of outside air to and from the conditioned space.

Additional actuators are provided for the manipulation of valves used to control the flow of fluid to the chiller and heater coils. Since digital signals from a field processing unit are often incapable of directly powering these actuators, it may be necessary to provide a separate, power amplifying and/or signal transducing equipment interface panel immediately adjacent each of the air handling units. These interface panels receive digital signals from the associated field processing unit and responsively provide pneumatic or electrical power at levels sufficiently high to position the actuators mechanically coupled to the dampers or valves. An example of a typical air handling unit for conditioning a space within a building is depicted in U.S. Pat. No. 4,263,931 while U.S. Pat. No. 4,261,509 illustrates an apparatus for controllably positioning a pneumatic actuator which is mechanically coupled to a damper of an air handling unit.

While systems of the aforementioned type are in wide use, they tend to be characterized by certain disadvantages. In particular, the headend central processing unit may be subject to periodic failures. In the event of a failure of a prescribed type, the entire building system or major portions thereof may be disabled. Additionally, the integrity or utility of the trunk conductors may be impaired by atmospheric electrical disturbances, failure of connected devices unrelated to the HVAC equipment control system, physical damage and the like. Unless the low level HVAC control and energy management units are capable of standing alone, i.e., of operating in the absence of a headend unit, whether by reason of equipment failure or control system design, and yet continuously performing those functions in an optimized manner, occupant discomfort and wasted energy may result. For example, while such data processing units are useful for detecting alarms or other default signals within the received signal information by it and for communicating those signals to the headend unit, they are frequently incapable of repetitively, algorithmically processing the information and generating commands or other signals based thereon. Field processing units of the described type have limited utility in that they contain no computer programs, either in single or selectable library arrangement, for continuously performing optimized control functions in a standalone mode or for permitting a local operator to select and modify an aspect of a program routine to meet the requirements of locally-changed environmental conditions. Another disadvantage of field processing units of the known type is that their control capability is frequently degraded when functioning in a standalone mode by reason of the failure of equipment related to the headend unit. That is, they are configured to retain actuator positions at settings which existed immediately preceding a fault rather than to continue to monitor and control positions for optimized energy management and occupant comfort.

Computer programming incorporated in headend, data processing or field processing units is usually configured in a relatively complex format requiring the services of an experienced, highly trained programmer for modification thereof. As a result, it is difficult or impossible for a relatively untrained user to modify data established in the programming in order to adapt the system to changed requirements.

Yet another disadvantage of systems of the known type is that they usually require a duplication of sensors at the individual datum points. For example, an air handling unit pneumatic interface panel may require that a temperature feedback sensor be disposed in an air duct to provide temperature-related information in the form of a pressure signal which is proportional thereto. The pneumatic interface panel will compare the temperature set point pressure signal received from the field processing unit with the pressure signal received from the temperature sensor, process the information by executing an analog algorithm and selectively change a damper position, depending upon whether an error exists. On the other hand, a sensor which emits a voltage signal proportional to temperature will be required to be installed in an air duct to provide temperature feedback to the headend central processing unit for performing the energy management function established therewithin.

A digital, microprocessor based control and energy management system which has a library of locally selectable, mnemonically identified computer program routines embodied therein and which permits operator modification of aspects of those routines, which combines certain functions of the central processor, the field processing unit and the equipment interface panel for low level distributed processing of information, which is capable of continuous standalone optimized control and energy management functions, which is capable of digital algorithmic execution and of direct digital control of actuators and which avoids the necessity of certain sensor duplicity would be a significant advance over the prior art.

SUMMARY OF THE INVENTION

In general, the low level, microprocessor based system controller of the present invention includes power supply means for providing a source of regulated electrical power to the controller. A field programmable processor means transfers certain program routines to and receives status signals from a field interface means and repetitively, digitally executes control and energy management algorithms respecting those signals in accordance with a computer program routine selected from a library of mnemonically identified routines residing in the read only memory (ROM) portion of the processor means. The processor means responsively directs programmed data and incremental position-change command signals to the field interface means which periodically updates the data base of the processor means, analyzes and conditions signals received therein from the processor means and from remote data points and selectively, directly controls the data points. An operator panel means having information display means is coupled to the processor means for displaying and adjusting selected system operating functions.

In a preferred embodiment, the power supply means includes a line power subassembly for receiving and conditioning the alternating current input power and a regulated power assembly for providing regulated direct current circuits at selected voltages. The line power subassembly includes a receptacle for power connection, a filter for conditioning the power by the removal of unwanted electrical noise and a line transformer having an input winding section which is reconnectable to adapt the subassembly to a variety of AC input voltages as, for example, 240 V., 220 V. or 120 V., 50 or 60 Hz.

The regulated power assembly includes a plurality of regulator circuits which, in a preferred embodiment, comprises seven such regulator circuits including a memory supply circuit for powering the random access memory (RAM) and the synchronizing clock circuitry located on the processor. It is preferable to avoid the necessity of reprogramming certain portions of the RAM and of resetting portions of the clock circuitry in the event of a power failure and, accordingly, the regulated power assembly also includes a standby battery for maintaining those functions for several hours in the event of a line power failure. Since a portion of the regulated power assembly is connected to the electrically isolated VMOS transistors which are capable of generating significant unwanted DC noise, it is preferable that this supply be isolated from the main regulator sub-assembly. The desired isolation is provided by an insulated winding disposed upon the switching inductor of one of the logic supplies.

The microprocessor-based, field programmable processor means has a data processing capability for receiving data messages, continuously digitally executing control and energy management algorithms and transmitting digitized analog-equivalent and binary data messages including command messages to a field interface means and, optionally, to a headend controller. Messages representative of analog values are preferably of the pulse width modulated type while binary messages are preferably of the high voltage/low voltage type. Such control algorithms permit the mathematical comparison of the desired condition of a field datum point with its actual condition, determination of the error therebetween and generation of a digital command signal for adjusting the position of the field equipment at the point. Received data messages may, for example, include signals related to temperature or humidity values within a conditioned space while transmitted messages may include command signals to effect movement of field equipment such as an actuator or a valve to a new position. Other types of messages transmitted by the processor means may include those related to a change in the setpoint of a temperature or to the coordinated, phased output reduction or deactivation of equipment at one or more field datum points for energy conservation purpose during time periods when the conditioned space is unoccupied.

The processor means is preferably designed around a type 8088 microprocessor and includes components for interfacing up to three type 8041A/8741A single chip peripheral processors, 8K bytes of static RAM and a total of 32K bytes of read only memory and/or programmable read only memory (ROM/PROM) for executing control and system energy management algorithms. Digitally executed control algorithms are provided within the processor programming for mathematically comparing the desired condition of equipment at a field datum point such as, for example, the position of a damper actuator, with the actual condition of the equipment. The algorithm determines the magnitude and polarity of any error therebetween and causes the generation of a pulse width modulated signal for adjusting the condition of the point to reduce the error to acceptable limits or eliminate it entirely. While algorithms of the proportional integral type are preferred, proportional and proportional integral derivative algorithms may also be employed alone or in combination. Digitally performed energy management algorithms are similarly provided for adjusting operating parameters to effect energy savings. Such algorithms take into account, for example, parameters related to actual and setback temperature points, time of day and date. An example of one such parameter is the temperature within a conditioned space which is normally occupied only during business hours. The space temperature may be significantly reduced during evening, weekend and holiday periods for energy conservation. Algorithms may also be provided for demand load limiting within the zone of field data points connected to the controller. In that manner, the energy consumption rate of lower priority equipment may selectively be reduced to limit the overall energy consumption rate within the zone.

The plurality of peripheral processors includes a master peripheral processor for receiving first command messages from the main processor and for generating a serial transmission of second command messages to the field interface means in accordance with a predetermined protocol established by the computer program residing within the master peripheral processor. A first peripheral processor provides data exchange entry and update between the main processor and the operator panel means while an optional second peripheral processor may be arranged in a slave communications protocol relationship with a remotely located processor disposed within a headend unit. The second peripheral processor thereby permits data exchange between the main processor and the headend unit located in the network for controlling multiple data zones within a building structure. While the first peripheral processor forms a portion of the processor means, it has a direct functional relationship to the operator panel means and is therefore preferably a structural component of the latter. Arrangement in this manner permits a significant reduction in the physical size of the processor means.

The microprocessor based field interface means is capable of interfacing with analog and binary field points and is provided for receiving and storing downloaded program data from the processor means, for analyzing and conditioning other signals received therein from the processor means and from remote equipment data points and for conditioning control signals of the pulse width modulated or binary type which are directed to such data points. The structure of the field interface means preferably includes an analog section, a binary section, a communications section, an internal processing section and a clock generator section.

The analog section incorporates a plurality of analog input points, a multiplex section, an amplifying section, and an analog-to-digital conversion section. Multiplexing is employed for a degree of power conservation and for system cost reduction while the amplifying section conditions those incoming data point signals from temperature sensors which may have a voltage range, from minimum to maximum, of about 0.9 V. to 1.7 V. in order that those signals may be represented by the full analog-to-digital converter range which, in the preferred embodiment, is 0–5 volts. While temperature detectors providing a non-linear voltage-temperature relationship may be used, this approach necessitates that a controller microcomputer be programmed to repetitively solve a high order polynomial equation. Accordingly, it is preferred that the voltage signal from the temperature sensor, e.g., a nickel wire sensor, be linearized by the incorporation of a voltage divider circuit. Linearization and conditioning in this manner permits the utilization of a simpler data conversion algorithm. Examples of field equipment of the analog type which are compatible to be connected to the analog input points of the analog section include actuator-coupled feedback potentiometers, and temperature, humidity and pressure sensors.

A binary section is provided for sensing contact status, pulse rate and pulse count and for controlling field data points and includes a plurality of inputs and outputs, the latter of which may be programmed for direct digital control of relays, actuators and switches. The control functions for the binary section are performed in accordance with computer programming introduced into the controller at the processor means and downloaded to the field interface means to reside in a binary input/output microprocessor of the latter. Examples of field equipment of the binary type which are compatible to be connected to the binary section include multi-position electrical switches and flow meters generating electrical pulse signals, the frequency of which is indicative of fluid flow rates therethrough. Other examples include relays, actuators and signal lamps.

The communication section implements a communications multidrop protocol facilitating communication with the master peripheral processor of the processor means while a first clock generator in the communications section is provided for synchronizing functions of the binary section as well as of the communications section. Additionally, the communication section is capable of being interfaced with other, remotely located field interface means by a serial communication system. Examples of such a system are a frequency shift keyed modem section or quadrature phase shift keying using telephone lines.

The internal processing section incorporates controlling and arithmetic processing program software together with ROM and RAM sections for providing program memory and data base memory capabilities, respectively. The internal processing section incorporates an address latch for demultiplexing bits of the external address, either data or program, from the address/data bus. A second clock generator is provided for synchronizing functions of the internal processing section and the analog section while a time pulsed reset circuit forces a power-on restart sequence to be initiated in the event that a program fails to run or runs incorrectly.

The system controller also includes operator panel means which cooperates with the processor means for displaying and adjusting selected system operating parameters. In a preferred embodiment, the structure of the operator panel means includes the first peripheral processor for providing input and output control, a buffer stage and a display stage for generating the desired visual displays and a keyboard panel for permitting the operator to adjust or select for viewing certain system operating parameters. The first peripheral processor receives certain program data from the master processor, the data being defined for use by the controller operator and related to the light emitting diode display function while data transmitted from the first peripheral processor to the master processor relates to keyboard and multiplexing functions. Clock signals received from the processor means are buffered for capacitance discharge, thereby insuring signals of an adequate voltage level. Signals therefrom are directed to a Darlington transistor buffer stage for generating the desired displays at a plurality of numerical and light emitting diode (LED) illuminated points for operator signalling. The displays are rapidly multiplexed for conservancy of component parts and consequent cost reduction while, at the same time, providing an appearance to the operator of a continuously illuminated display. The keyboard panel includes a plurality of keypad switches arranged in a matrix array for selecting data point values to be read and for adjusting the settings of certain data points as permitted by the program routine selected from a library of routines residing in the ROM and RAM portions of the processor means and accessed via the master processor thereof. When constructed and arranged in this manner, the operator panel means permits an operator to interrogate and receive information from the system controller and instruct it regarding, for example, the self-testing of lamps and illuminated numerical indicators and status of a variety of field data points. The operator panel means may thereby perform functions related to keyboard entry reading, display and data updating and orderly communicating between the operator panel and the processor means. It also provides information on field point operation, data reliability and system alarms and permits the clearance of alarms and overrides. While the system controller is capable of continuously monitoring and controlling, in a standalone mode, a plurality of field points connected to its self-contained field interface means, it may optionally be desirable to provide the controller with a capability for being coupled to and communicating with a headend unit to form a hierarchical network. Accordingly, the controller processor means may optionally include a trunk network interface means comprising a second peripheral processor and a communications interface board for effecting communications between the system controller and a headend unit. It may also be desirable to connect one or more remotely located field interface means to a single system controller. To that end, communication between the master peripheral processor of the processor means and such remote interface means may be effected through an appropriate modem as, for example, a frequency-modulated modem. The electronic panels comprising the power supply means, processor means, field interface means and operator panel means are advantageously constructed using printed circuit boards having points brought to a terminal area for external connections thereto. Such terminal areas are typically configured to define a protruding lip member having a plurality of terminal strips disposed thereon in parallel, spaced apart relationship for receiving the first side of a sliding edge connector block. At the second side, the block may include spade or screw connectors for attaching wiring. While connections to external wiring may be effected in that manner, installation and troubleshooting will be facilitated by the incorporation of an optional field termination board. A preferred field termination board includes a first side having a plurality of termination points for the binary output functions, for binary and analog input functions, for communications functions and for power supply terminals. Connections between the termination board and the controller subcomponent panels are by a plurality of appropriately configured edge connector segments arranged in spaced apart relationship along the second side of the termination board and for sliding engagement with the lip members of the subcomponent panels.

While the foregoing system controller, with or without the field termination board, will provide an operable system, it may additionally be desirable to provide a means to mount the electronic panels and to protect the controller from physical damage or from contamination by airborne dust. Further, an installer may wish to effect a step-by-step phased installation of the system whereby wallspace dedication, controller rough-in and field wiring may be accomplished in advance of mounting the system controller components. These objectives will be facilitated by the use of a controller enclosure having ductwork disposed at the rear thereof for receiving and channeling incoming wire bundles. A mounting position is provided at the lower portion of the enclosure for the installation of a field termination board for connecting incoming wiring in advance of the installation of the various controller panels.

The control commands generated by the system controller are preferably of the incremental change type for commanding a controlled device, such as an actuator, to move a specified percentage of its available span rather than of the proportioned type requiring a controlled device to move to a prescribed position. Such commands result from the digital solution of a proportional integral algorithm having a velocity, i.e., incremental equation form. The positioning of actuators by command signals resulting in an incremental change may avoid the necessity of position feedback devices such as potentiometers. The controller programmed processes may also be configured for the solution of proportional and proportional integral derivative algorithms arranged in position equation form if position feedback control is desired or required. By way of an example of a command of the incremental change type, an electronic or pneumatic actuator coupled to an air damper may be commanded to move in a specified direction, as indicated by signal polarity, a distance equal to 10 percent of its total travel capability or span rather than to move to a prescribed position.

In accordance with one aspect of the invention, the computer program routines used therewith are of the user language rather than of the programmer language type. That is, the routine functions and signals are identified by mnemonics suggestive of the function or signal itself. Such configuration results in more rapid assimilation of the routines by the operator-user and also permits the user to generate other programs for incorporation into the controller.

Given appropriate field equipment, the system controller and its associated actuator hardware may be configured as an electronic system using electrical actuators or as an electronic/pneumatic hybrid. The latter may be desirable where pneumatic actuator hardware is in existence at a building site or where lower overall cost is preferred.

It is an object of the invention to provide a low level system controller which overcomes the aforementioned disadvantages of the prior art.

Another object of the invention is to provide a controller incorporating a library of mnemonically identified computer program routines capable of being used in the controller by field programming.

A further object of the invention is to provide a controller having means for local operator adjustment of selected system operating parameters.

Yet another object of the invention is to provide a controller for digital execution of function control and energy management algorithms.

Still another object of the invention is to provide a controller for direct digital positioning control of system actuators.

Another object of the invention is to provide a controller which combines certain functions of a central processing unit, a field processing unit and an equipment interface panel for low level distributed processing of control and energy management information.

Yet another object of the invention is to provide a controller which avoids the necessity of utilizing duplicate environmental sensors.

Yet another object of the invention is to provide a low level controller for performing optimized, continuous control and energy management functions in a standalone mode. These and other objects of the invention will become more apparent from the detailed description thereof taken in conjunction with the accompanying drawing.

DESCRIPTION OF A PREFERRED EMBODIMENT

Figure 1:
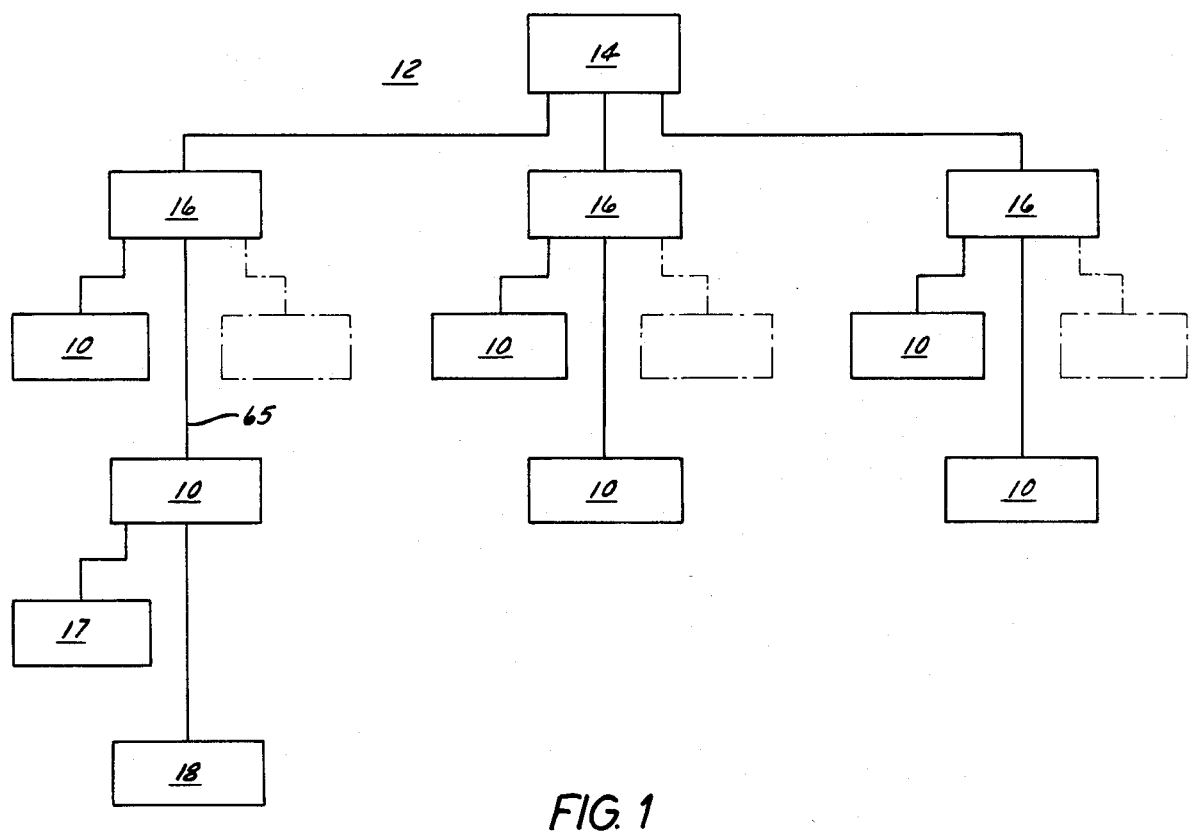
FIG. 1 is a simplified schematic diagram of an automated network environmental control system incorporating the system controller of the present invention.

Referring to FIG. 1, a plurality of system controllers 10 is shown in connection with an automated network environmental control system 12 having a centralized headend unit 14 at the first hierarchical level for monitoring and controlling several data zones within, for example, a multistory office building. The computerized headend unit 14 may incorporate an operator display panel and may include computer programs for demand load control of a multiplicity of system controllers 10 within the building. While several system controllers 10 may be coupled directly to a headend unit 14 to define a two level system, a three level system is illustrated and portrays a plurality of data processing units 16 disposed at the second hierarchical level for checking and verifying information passing between the controllers 10 and the headend unit 14. Since the headend unit 14 is responsive to the condition of all field data points connected to it via the controllers 10, the headend unit 14 may effect a reduction in output and/or an orderly shutdown of predetermined functions within any of several data zones for overall demand limiting purposes. Each of the third level system controllers 10 is connected to one or more field equipment units as, for example, an air handling unit 17 or a chiller plant 18.

Figure 2:
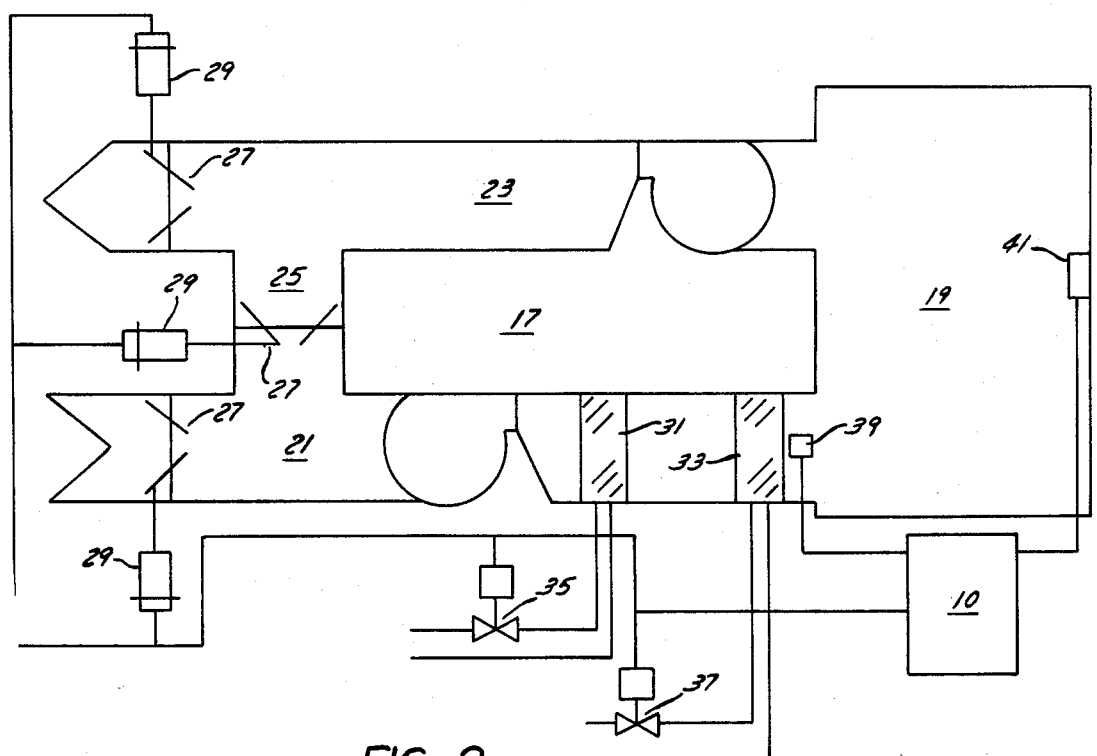
FIG. 2 is a schematic view of the system controller of the present invention shown in conjunction with a heating, ventilating and air conditioning subsystem comprising an air handling unit.

Referring next to FIG. 2, the system controller 10 is shown in connection with a heating, ventilating and air conditioning subsystem comprising an air handling unit 17 for regulating the temperature of a space 19 to be conditioned. Such a space 19 may comprise, for example, a single room or a plurality of adjacent rooms within an office building. The air handling unit 17 includes a first duct 21 for directing air from the outdoor ambient to the conditioned space 19, a second duct 23 for directing air from the conditioned space 19 to the outdoors and a third duct 25 connected between the first duct 21 and second duct 23 for air mixing. Dampers 27 are provided within the ducts 21, 23, 25 for regulating and mixing airflows with the position of each damper 27 being monitored and controlled by the controller 10. Damper positioning is by a pneumatic or electric actuator 29 mechanically coupled thereto. The first duct 21 also includes a cooling coil 31 and a heating coil 33 disposed therein for controlling the temperature of the air passing therethrough to the conditioned space 19. The cooling coil 31 and heating coil 33 each incorporate piping having a water valve 35 and 37 respectively, for controlling the flow of chilled or heated water to the associated coil. A temperature sensor 39 is disposed within the first duct 21 for providing a voltage signal to the controller 10 which is indicative of the temperature of the air being introduced into the conditioned space 19. The space 19 may also have disposed therein a temperature sensor 41 for providing a voltage signal to the controller 10 which is indicative of the air temperature within the space 19. The position of the damper actuators 29, of each of any electrical relays or solenoid valves (not shown) used to control the flow of compressed air to damper actuators 29, the signal from the temperature sensor 39 and the signal from the temperature sensor 41 each represent a field datum point to be monitored or controlled by the controller 10. When used alone for continuously monitoring and controlling equipment within one or more data zones as represented by the exemplary air handling unit 17 or when used as part of an overall network 12 when such monitoring and control functions are performed in isolation from other points in the overall network 12, the controller 10 is said to be functioning in a standalone mode.

Figure 3:
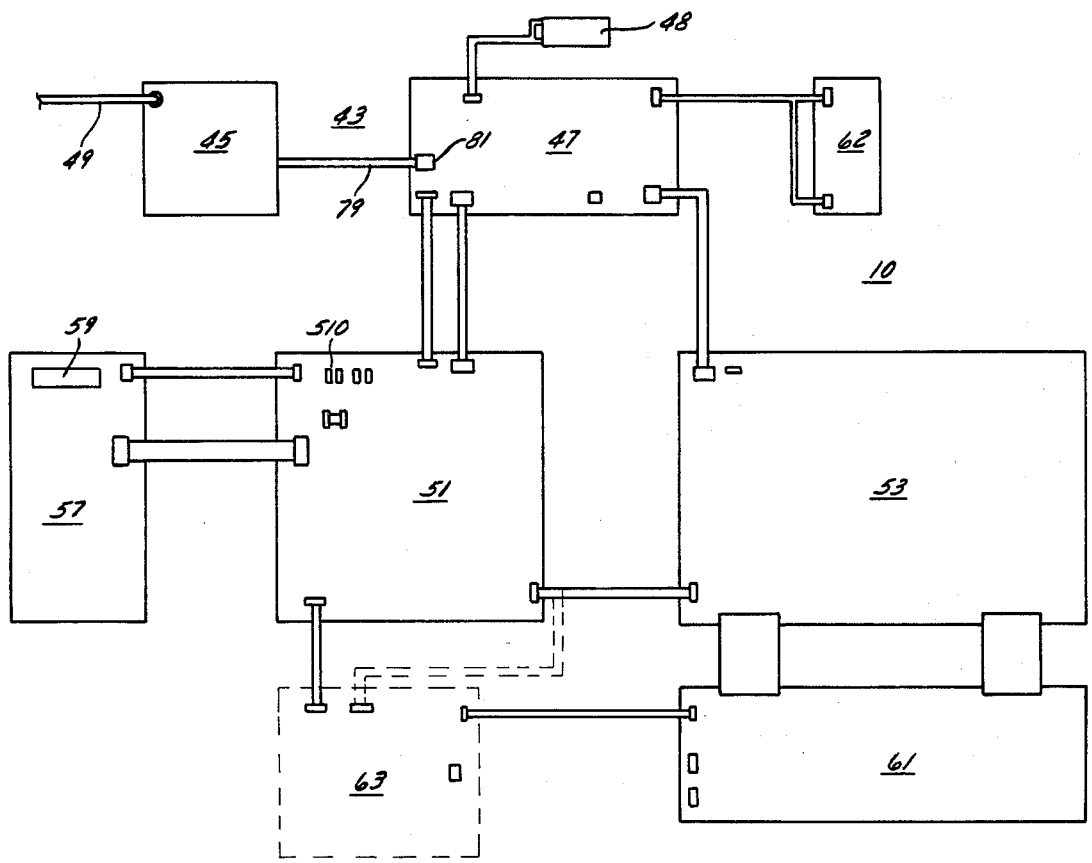
FIG. 3 is a simplified, block interconnection diagram of the system controller of FIG. 2.

As shown in FIG. 3, the controller 10 includes a power supply 43 comprising a line power section 45 and a regulated power assembly 47 with main filter capacitor 48 for receiving energy from an electrical line 49 and for providing a source of regulated electrical power to the controller 10. A processor means 51 receives data point status signals from the field interface means 53 and digitally executes algorithms respecting those signals in accordance with computer program routines selected from a stored library of routines. The processor means 51 responsively directs command signals to the field interface means 53 which analyzes and conditions signals received therein from the processor means 51 and from the field data points and monitors and controls those data points for achieving the result determined by the program routines. An operator panel 57 having an information display section 59 cooperates with the processor means 51 for permitting the display and adjustment of selected system operating parameters. Signals are directed between the various remote data points and the field interface means 53 by an optional field termination board 61 which provides convenient wire termination points. A backup battery 62 is continuously charged by the assembly 47 and prevents loss of stored data in the event of a power failure. If the controller 10 is used in conjunction with a building network as shown in FIG. 1, an optional network interface means 63 permits communications with higher-level data processing units 16 and headend units 14 and/or with other system controllers 10 via a headend unit 14. When the controller 10 is so arranged within a network 12, substantial reductions in the size and cost of the headend unit 14 are effected since significant portions of the data processing normally centrally performed by the headend unit 14 are now distributed to and performed by the system controllers 10. Further, the continuous control and monitoring capability of the system controller 10 results in enhanced system reliability since a failure in the headend unit 14, in a data processing unit 16 or in a connecting trunk 65 may affect none or only a few of the system controllers 10 connected thereto. In order to facilitate intra controller and inter controller communications, it is preferable to use a uniform communications protocol and a preferred protocol is one of the single master, variable message length, serialized polling type.

Figure 4:
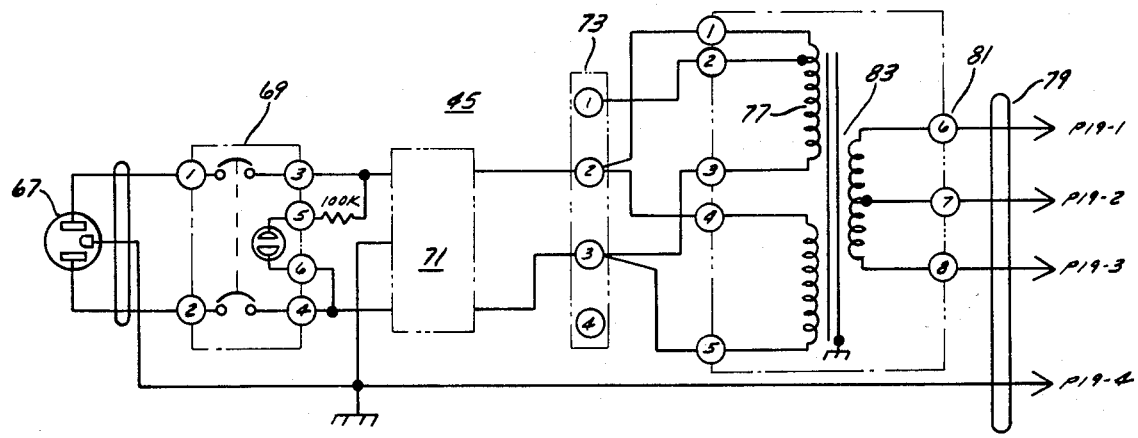
FIG. 4 is a schematic diagram of the line power assembly portion of the system controller power supply.

More particularly and as shown in FIGS. 3 and 4, the line power section 45 of the power supply 43 includes a three prong AC line plug 67 for receiving power from the incoming line 49 and a circuit breaker 69 for line switching and over-current protection. The setting of the breaker 69 is based upon full load inrush, maximum ambient and maximum line voltage conditions. A line filter 71 is provided for the reduction of radio frequency and electromagnetic interference while a terminal block 73 provides a convenient means of reconnecting the primary of the line transformer 77 to accommodate line voltages of preferably 120 V., 220 V. or 240 V., 50 or 60 Hz. A suitable harness 79 and plug 81 connect the transformer secondary 83 to the regulated power assembly 47 for providing a low voltage AC input thereto.

Figure 5:
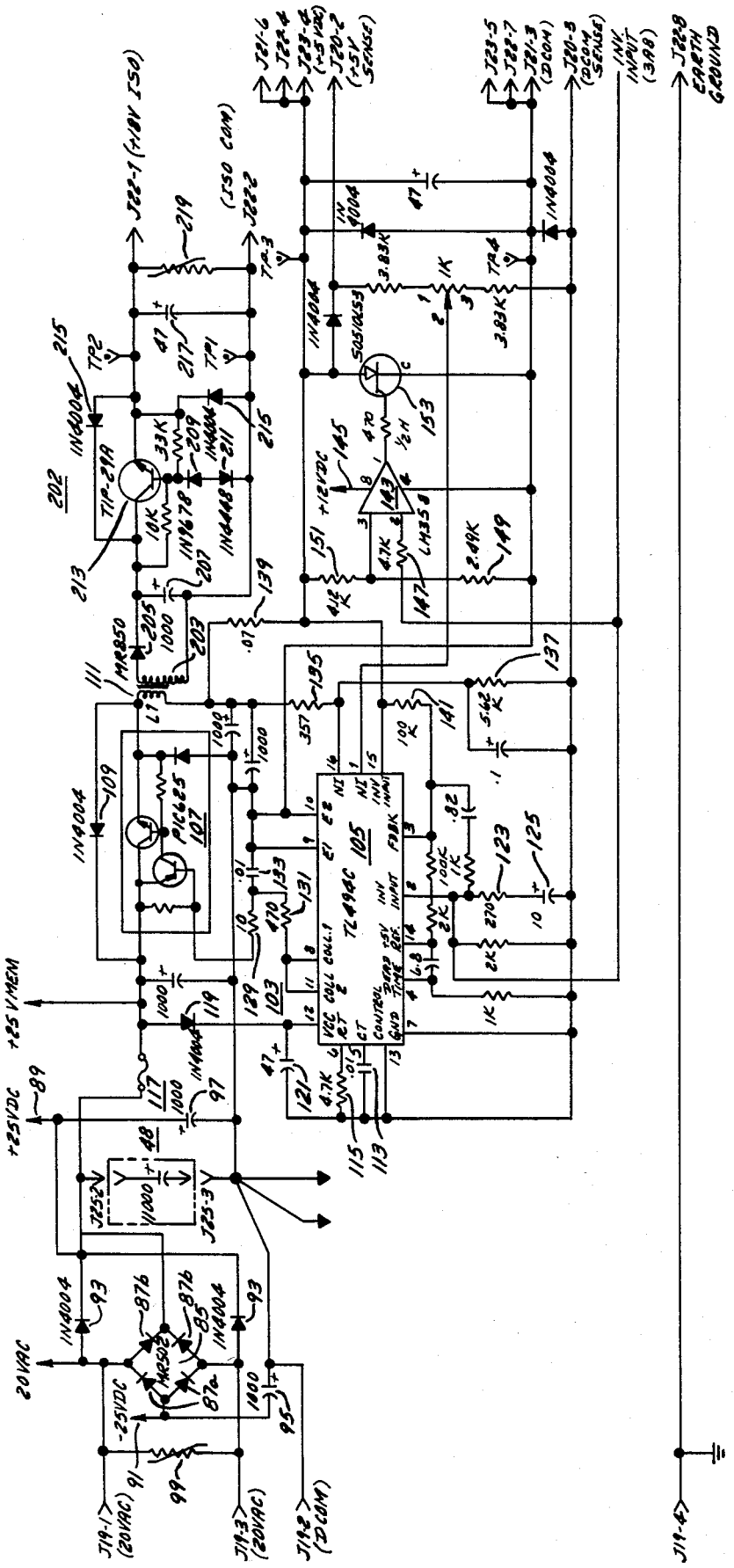
FIG. 5 is a schematic diagram of a first portion of the regulated power assembly of the system controller power supply.
Figure 6:
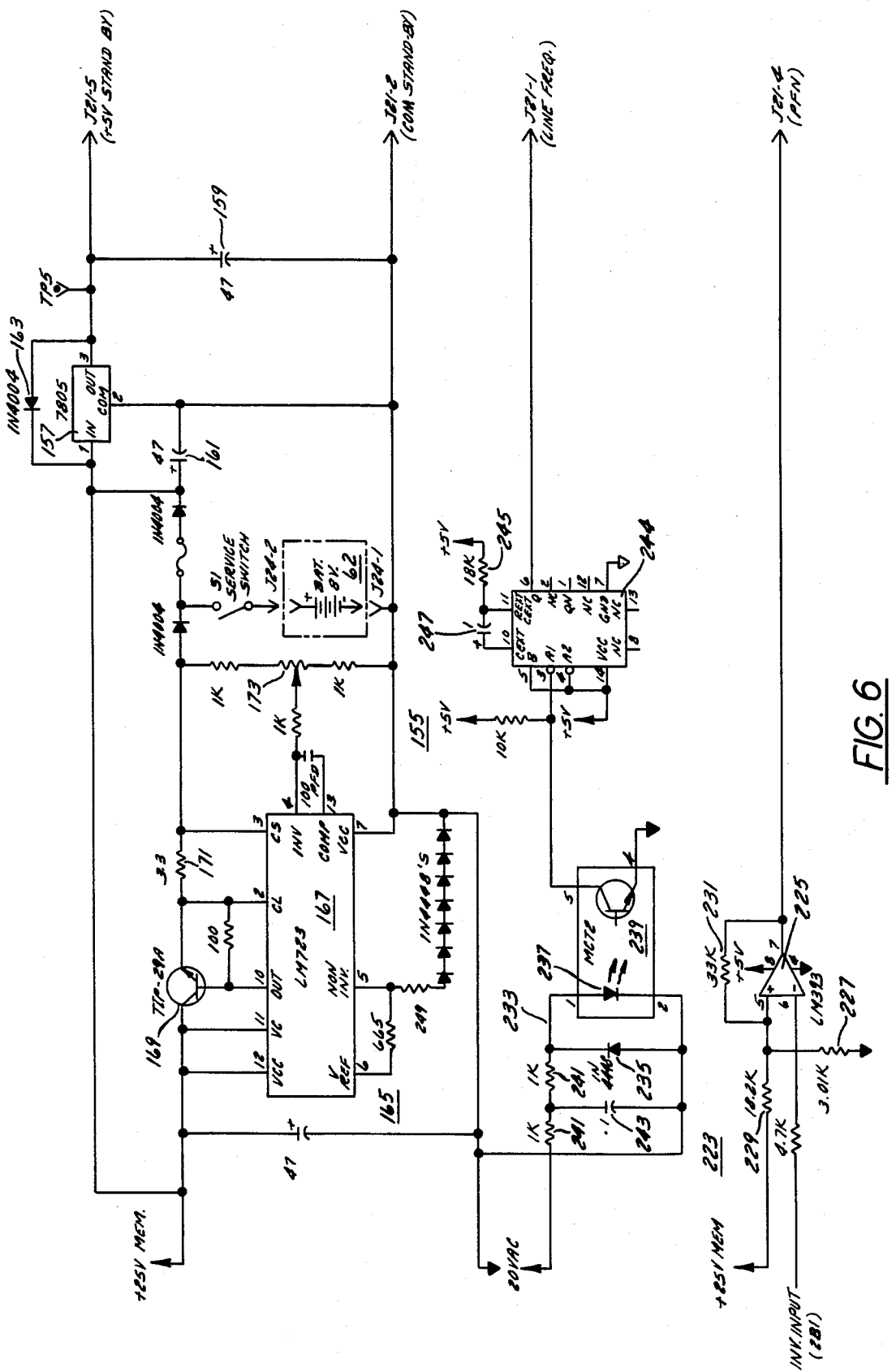
FIG. 6 is a schematic diagram of a second portion of the regulated power assembly of the system controller power supply.
Figure 7:
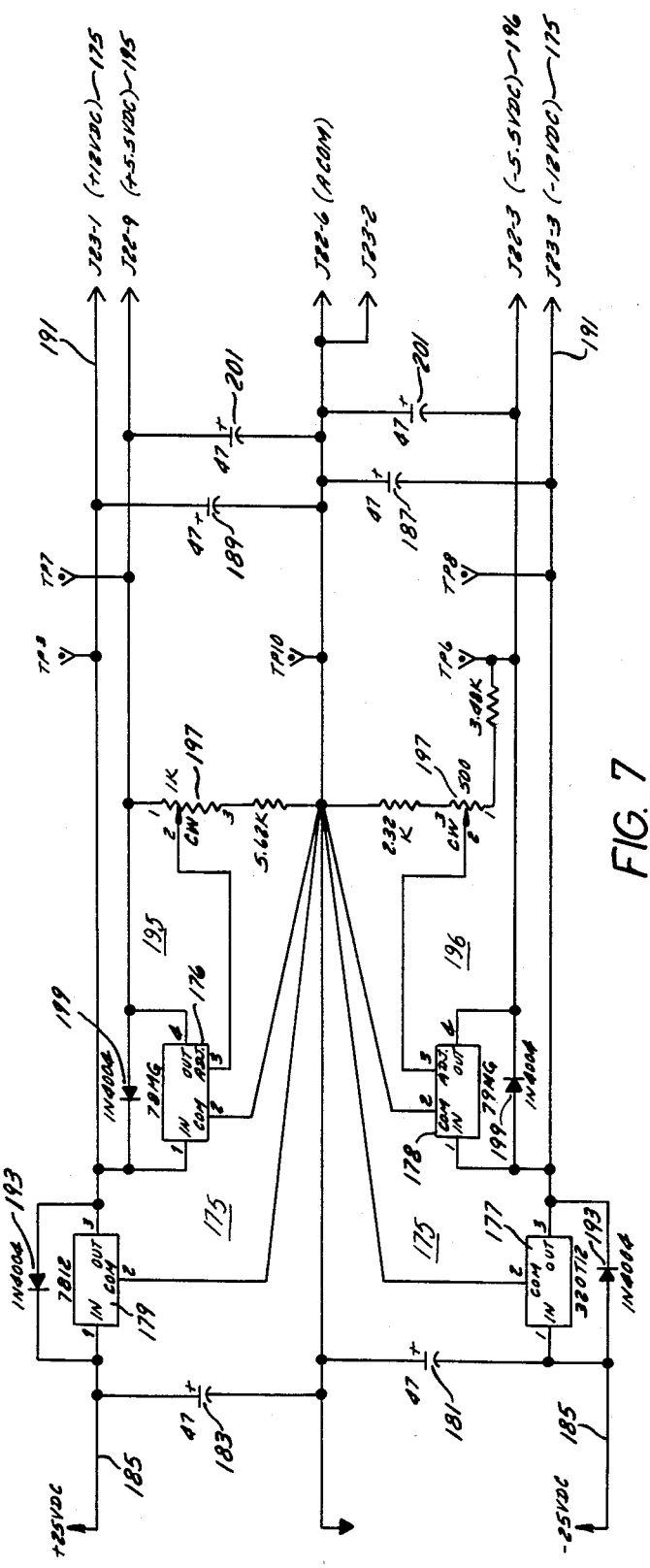
FIG. 7 is a schematic diagram of a third portion of the regulated power assembly of the system controller power supply.

Referring next to FIGS. 5, 6 and 7, the regulated power assembly 47 is shown to include the associated voltage regulator and auxiliary circuits as well as circuitry for developing and filtering two sources of unregulated DC power for use by the regulators.

As best seen in FIG. 5, the full wave bridge 85 comprises diodes 87a and 87b which supply a filtered DC voltage having positive and negative polarities available at the points 89 and 91, respectively. The diodes 87a, 87b cooperate with diode 93 for maintaining RAM and for charging the standby battery 62. Main supply filtering is by the capacitor 48 while filtering of the low powered negative and separate memory/battery circuits is by capacitors 95, 97 respectively. A metal oxide varistor 99 protects the system from line voltage surges.

The +5 V. pulsewidth modulated, voltage level reducing, digital supply 103 incorporates a switching regulator 105, a current foldback feature for overcurrent protection and an overvoltage protection circuit, all as described in greater detail below. Power handling is by transistor network 107 comprising a PNP and an NPN transistor connected in a quasi-Darlington relationship and includes a flyback diode 109 which provides a discharge path for the energy stored in the filter inductor 111. The values of the capacitor 113 and resistor 115 determine the operating frequency which in a preferred embodiment has a range of 20 KHz. minimum, i.e., above the audio band, to about 40 KHz. maximum. A sawtooth shaped ramp signal is generated within the TL494 regulator 105 and is compared to a voltage derived from the regulated output of network 107, the difference of which is introduced to the pulsewidth modulator comparator internal to the regulator 105. The resulting signal provides the base drive for the power switching transistor network 107. The switching regulator 105 is biased and decoupled from the +25 V. bus 117 by means of a diode 119 and capacitor 121. Resistor 123 and capacitor 125 are provided for decoupling system noise and increasing the relative system gain at the 120 Hz ripple frequency. Resistors 129, 131 and capacitor 133 are provided for controlling the DC base drive to network 107 and provide leading edge shaping to minimize system ringing and attendant high frequency noise. Resistors 135, 137 establish an offset voltage to be overcome by the voltage drop across the resistor 139 before the current sensing circuit can become operational while feedback resistor 141 establishes the gain for achieving consistent results from the regulator 105. A current foldback function is thereby provided which utilizes the high gain of one of the operational amplifiers internal to the switching regulator 105 to achieve a substantially increased level of current signal sensitivity. This permits the use of a current sensing resistor 139 which may then have a very low value, on the order of a few hundredths of an ohm, for decreased heat dissipation and temperature rise and consequent improved efficiency and component life. The LM358 operational amplifier 143 is connected as a high-gain comparator with its operating bias supplied by the +12 V. regulated bus 145 for providing overvoltage protection. The overvoltage circuit includes isolating resistor 147, voltage dividing resistors 149, 151 and an S0510LS3 silicon controlled rectifier 153, all for providing a predetermined trip point voltage.

Referring next to FIG. 3 and particularly to FIG. 6, there is shown the +5 V. memory supply 155 which provides operating power to the +5 V. type 7805 memory regulator 157 and thence to the RAM function of the processor 51. Capacitors 159 and 161 provide local decoupling while diode 163 protects the internal pass transistor of the memory regulator 157 from damage upon sudden removal of input power. During a power outage of up to 30 hours duration, the standby battery 62 supplies power for the memory regulator 157, a standby time-of-day clock as described below and also maintains a portion of the RAM in a data retaining, reduced power standby mode. The battery charging regulator circuit 165 includes an LM723 voltage regulator integrated circuit 167 and a TIP29A series pass element 169. In the event the battery 62 becomes deeply discharged, the current limiting function is used to maintain the charging current near a maximum level set by a resistor 171 until such time as the battery countervoltage begins to rise. Once the regulator circuit 165 regains control during battery charging, charging current will be determined by the setting of a variable resistor 173 which permits precise setting of the float voltage.

Referring next to FIG. 3 and particularly to FIG. 7, the power assembly 47 includes ±12 V. supplies 175 which use a 320T12 regulator 177 and a type 7812 regulator 179 for the negative and positive portions respectively. Capacitors 181 and 183 decouple the input buses 185 while capacitors 187 and 189 provide noise and ripple filtering of the output buses 191. The diodes 193 are provided to protect the regulators 177, 179 against voltage overstress. The ±5.5 V. analog supplies 195 and 196 are similar in concept to the 12 V. supplies 175 from which they derive power and utilize a type 78MG and a type 79MG regulator 176, 178, respectively. It is preferred that the voltages to the analog devices be carefully regulated and the use of a pre-regulated power source for energizing these supplies will result in a marked improvement in regulator performance. In order to achieve the high resolution capability required for proper functioning of the analog system, trimming potentiometers 197 are provided. Diodes 199 are used as protective devices while noise and ripple rejection is provided by capacitors 201.

To prevent unwanted electrical noise which may be coupled by the VMOS devices from the binary output portion of the field interface means 53 into the regulated power assembly 47, it is preferred that this output portion be driven by a +18 V. isolated DC supply 202. Accordingly, and as shown in FIG. 5, isolation of the separate supply is by a transformer winding 203 disposed upon the core of the switching inductor 111 of the main +5 V. digital supply 103. This arrangement permits the required low level of energy to be derived from the isolated supply 202 without affecting the +5 V. digital supply 103 so long as a predetermined minimum current is drawn from the supply 103 which, in the construction of a preferred embodiment, is approximately 600 ma. The high frequency voltage is rectified by a high-speed, rapid recovery rectifier 205 having noise and ripple filtered by a capacitor 207. The output voltage is set by the algebraic sum of the voltage across the zener diode 209 added to the voltage drop across the diode 211 minus the base to emitter voltage of type TIP29A transistor 213 and totals approximately 18 V. Reverse polarity protection is provided by diodes 215 while output noise and ripple filtering is by a capacitor 217. A metal oxide varistor 219 protects the circuit from line voltage surges otherwise coupled thereto from the binary output section.

The power supply filter capacitors 48, 95 and 97 retain a voltage supporting charge for a period of about 20 milliseconds and it is desirable that brownout or impending power failure conditions be sensed during that time so that certain anticipatory functions can be accomplished. To this end, a voltage comparator circuit 223 is depicted in FIG. 6 which utilizes a portion of gate 225 and voltage dividing resistors 227, 229 for sampling the unregulated DC voltage. This sampled voltage will vary directly with AC input line voltage and is compared to a fixed reference voltage derived from the regulator 105 shown in FIG. 5. Depending upon the value of the reference voltage, component tolerances and power supply load, a resistor located on the processor means 51 will cause an elevated voltage at the open collector of gate 225 at a line voltage of between 80–100 volts. Resistor 231 adds positive feedback to the comparator circuit 223, thus preventing oscillation due to slowly changing line voltage conditions or to ripple on the unregulated DC supply.

In order to provide a timing pulse which is in synchronization with line frequency, there is provided a 20 V. output source 233 as shown in FIG. 6 which comprises one half of the AC line transformer 77 (FIG. 4), the output of which is halfwave rectified by a diode 235 and by the opto diode 237 within opto coupler 239. Resistors 241 and capacitor 243 cooperate with the bandpass characteristics of the coupler 239 for filtering and removing line noise. The resulting signal is applied as a trigger voltage to a type 74121 multivibrator 244, resulting in a line synchronized signal with rapid rise time and long duty cycle for maximum noise tolerance. The time constant of the circuit comprising the resistor 245 and capacitor 247 determines the duty cycle of the output terminal of multivibrator 244 which is preferably in the range of 60–90%.

Figure 8:
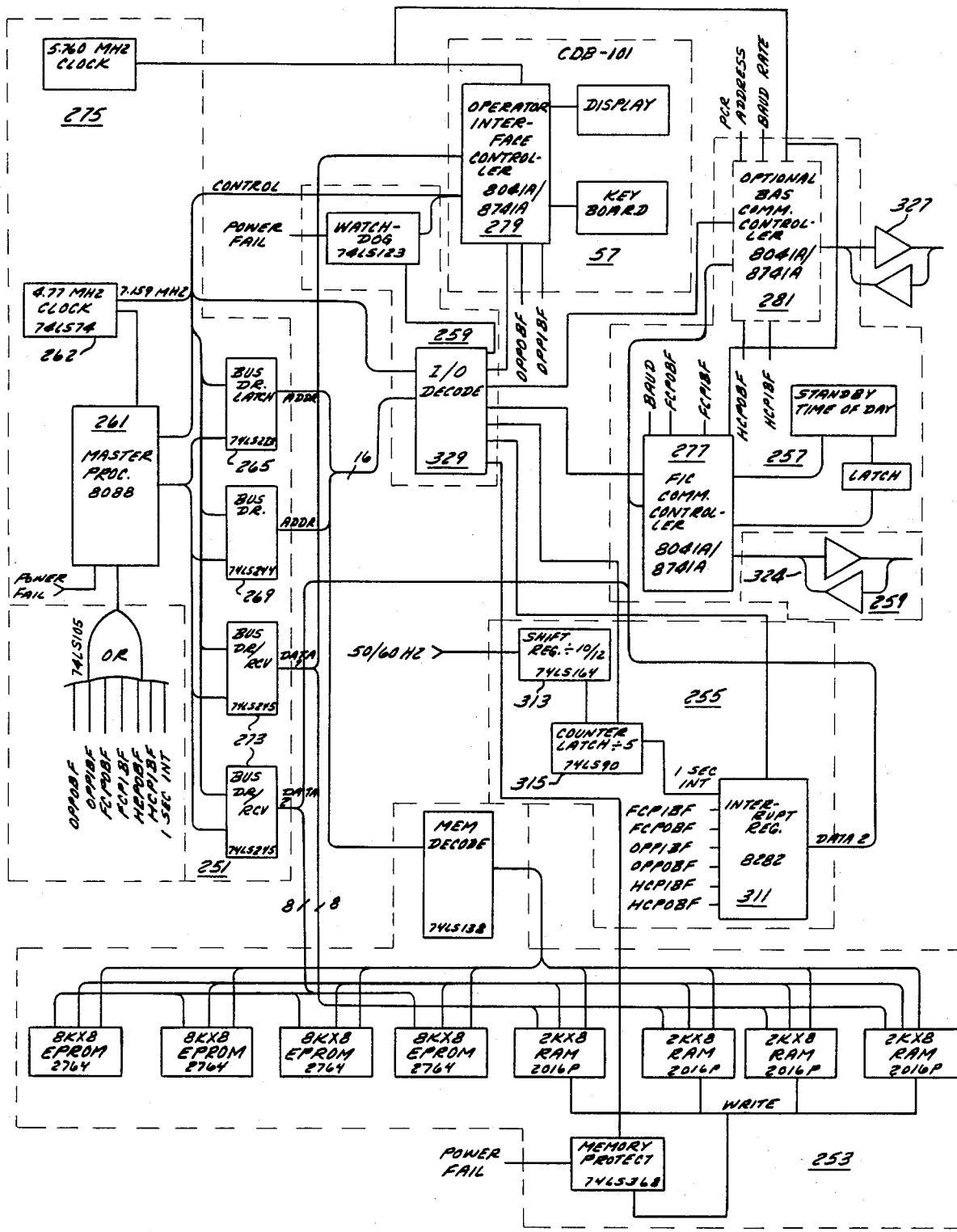
FIG. 8 is a simplified, block diagram of the controller processor means shown in conjunction with the operator panel means.

The construction and operation of the processor means 51 will best be understood by reference to FIG. 8 depicting the processor means 51 in simplified, block diagram form and to FIGS. 9, 10, 11, 12 and 13 which illustrate in detailed schematic form the various portions thereof. In general, the processor means 51 is shown in FIG. 8 to include a master processor section 251, a memory section 253, a register section 255, a communications section 257 and a decoder section 259.

Referring to FIGS. 8, 9, 11, 12 and 13, the master processor section 251 is shown to include a master microprocessor 261, a first clock generator 262 having a wait state portion comprising three integrated circuits 263, 263', type 8284 and 74LS74 respectively, for providing the master processor clock signal, a combination bus driver and latch 265 for demultiplexing a first group of master processor address lines 267 and a buffer driver 269 for driving a second group of master processor address lines 271. The clock generator 262 having a wait state portion provides for one additional clock period to each cycle of the bus 283 of the master microprocessor 261 in order that sufficient time be available to access more economical but slower devices connected thereto and devices with access times of up to 450 nanoseconds may thereby be utilized. The driver/latch combination 265 includes a type 74LS273 latch chip 272 and a pair of bidirectional bus drives 273, the latter for dividing and driving the current and capacitive loading of each device connected to the bus. A second clock generator 275 is provided for establishing a synchronizing clock signal for the master peripheral processor 277, the first peripheral processor 279 and the optional second peripheral processor 281.

More particularly, the master processor section 251 utilizes a type 8088 master microprocessor 261 capable of interfacing with a plurality of peripheral type 8041 single chip processors, namely, processors 277, 279, 281. The master microprocessor 261 includes an 8 bit external data bus 283 interfaced with a 16 bit internal bus while sixteen of the 20 address lines 285 of the microprocessor 261 are externally decoded for memory addressing. The microprocessor 261 is capable of adding, subtracting, multiplying and dividing using 8 bit and 16 bit signed and unsigned binary or decimal numbers. A master peripheral processor 277 in the communication section 257 implements a communications protocol of the single master, variable message length, serialized polling type and thereby provides control and communication functions between the processor means 51 and either the local field interface means 53 or a remote field interface means. A first peripheral processor 279 located on the operating panel means 57 and having a functional relationship to the processor means 51 also provides message formatting and decoding functions, thereby interconnecting with and effecting communications between the operating panel means 57 and the master processor section 251. Referring additionally to FIG. 1, while the system controller 10 is capable of performing optimized control and energy management functions while operating in a standalone mode, it may be desirable to couple several such system controllers to a headend unit 14 controlling the network system 12. Accordingly, the processor means 51 may also have located thereon an optional second peripheral processor 281 arranged in slave protocol relationship with a master processor on a headend unit 14 for facilitating communications between the system controller 10 and the headend unit 14. As shown in FIGS. 8–12, the master processor section 251 is arranged for interfacing with a memory section 253 comprising first memory units 287 incorporating up to 8K bytes of static RAM and second memory units 289 providing up to 32K bytes of ROM/PROM.

The master microprocessor 261 receives data signals at a first, maskable interrupt input 290 which facilitates communications between the microprocessor 261, the master peripheral processor 277, the first and optional second peripheral processors 279, 281 and the register section 255, the latter utilizing shift register 313 and counterlatch circuit 315. A second, nonmaskable interrupt terminal 291 is provided for sensing a power failure and since signals present at the nonmaskable interrupt terminal 291 are predetermined to be of higher priority than those appearing at the maskable interrupt input 290, signals indicating a power failure will always be communicated to the microprocessor 261 in advance of any signals being communicated for indicating other parameters.

The clock generator 262 includes a type 8284 integrated circuit clock chip 263 having a first input terminal connected to a crystal 293 selected to operate at a first frequency, preferably 14.31818 MHz which is four times the color burst frequency. A first chip output terminal 295 provides a master microprocessor clock signal at a frequency of 4.77 MHz while a second chip output terminal 296 provides a signal at the crystal frequency which is directed to the input terminals of a type 74LS74 divider circuit 264, the output of which provides a modem clock frequency equal to one half that of the crystal frequency.

After multiplexing within the master microprocessor 261, a first group of processor address and data lines 267 is demultiplexed by a combination bus driver/latch circuit 265, the outputs of which are directed along mnemonically identified address lines ADDR0–ADDR7 to an input/output decoding circuit shown and described elsewhere. The remaining master microprocessor address lines 271 (ADDR8–ADDR15) comprising the second group are directed to a buffer/driver circuit 269 and thence to the memory section 253 and the memory decoder section 307.

Figure 9:
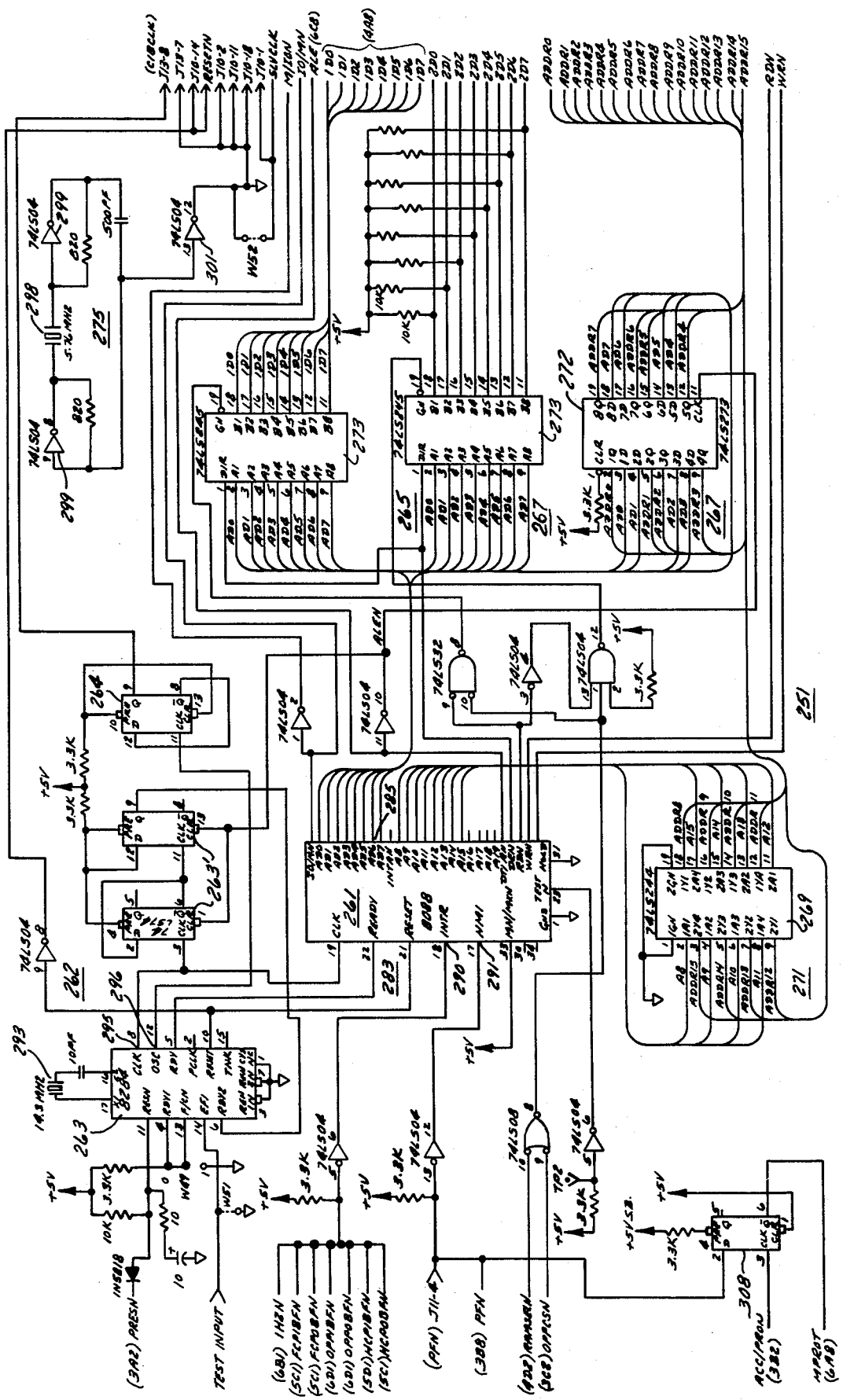
FIG. 9 is a schematic circuit diagram of the master processor section of the controller processor means.
Figure 12:
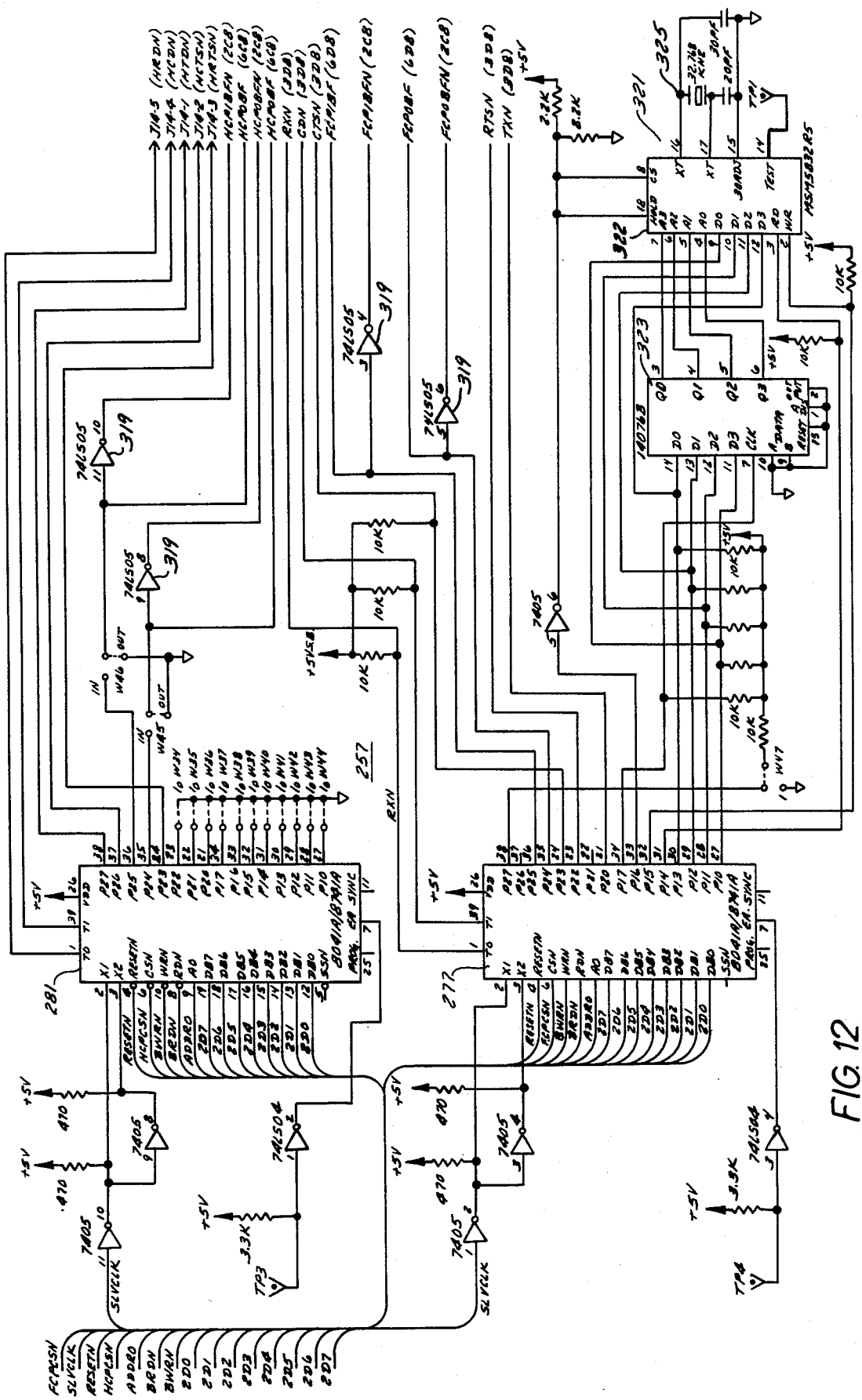
FIG. 12 is a schematic circuit diagram of the communication section of the controller processor means.
Figure 23:
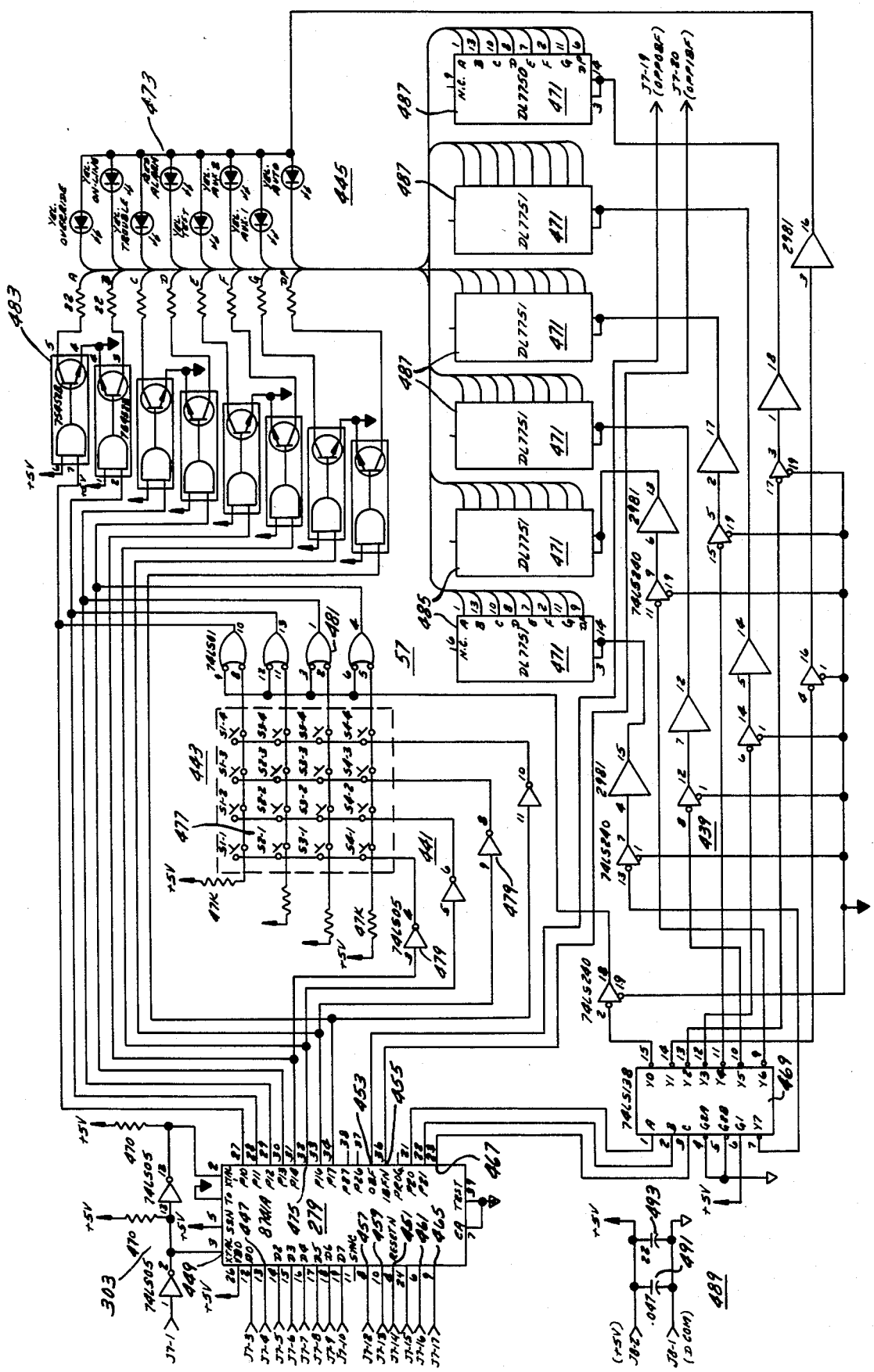
FIG. 23 is a schematic circuit diagram of the controller operator panel means.

Synchronization of communications between the various signal emitting and receiving components located on the operator panel means 57 is facilitated by the second clock generator 275 shown in FIG. 9 as a part of the master processor section 251 and including an oscillator crystal 298 connected to a pair of first inverters 299 arranged in a flipflop circuit. As shown in FIGS. 9, 12 and 23 the signals from the flipflop circuit are directed to a second inverter 301, the output of which is coupled to the clock buffer section 303 of the operator panel means 57, to the optional second peripheral processor 281 and to the master peripheral processor 277. The crystal 298 may be selected to have any one of a relatively wide range of oscillating frequencies in the 1–6 MHz range. However, crystal selection is preferably made in view of any frequency-dividing characteristics of the processors 277 and 281 and in view of the selected baud rate. Since the preferred type 8041A/8741A peripheral processors 277 and 281 incorporate means for frequency division by 15 and in view of the selected baud rate of 9600, the oscillating frequency of the crystal 298 is preferably selected to be 5.760 MHz for optimum synchronization.

Referring now to FIGS. 8, 9, 10, 13 and 11, the memory section 253 is shown to include a pair of type 74LS138 integrated circuits 307 to provide a memory decoder, a plurality of type 2764 second memory units 289, a plurality of type 2016P first memory units 287 and a memory protection circuit comprising a type 74LS74 integrated circuit 308 and a type 74LS368 integrated circuit 309. In order to permit the master microprocessor 261 to address the appropriate memory circuit, the integrated circuits 307 each provide for decoding a total of five of the main processor's twenty address lines. Four of the twenty lines are unused while the remaining eleven lines are decoded by memory units 287 and 289. Three of the four first memory units 287 together with the memory protection integrated circuits 308, 309 are connected to the standby battery 62 for preventing the information residing in those memory units 287 from being changed or added to during a failure of the main power supply 43.

Figure 13:
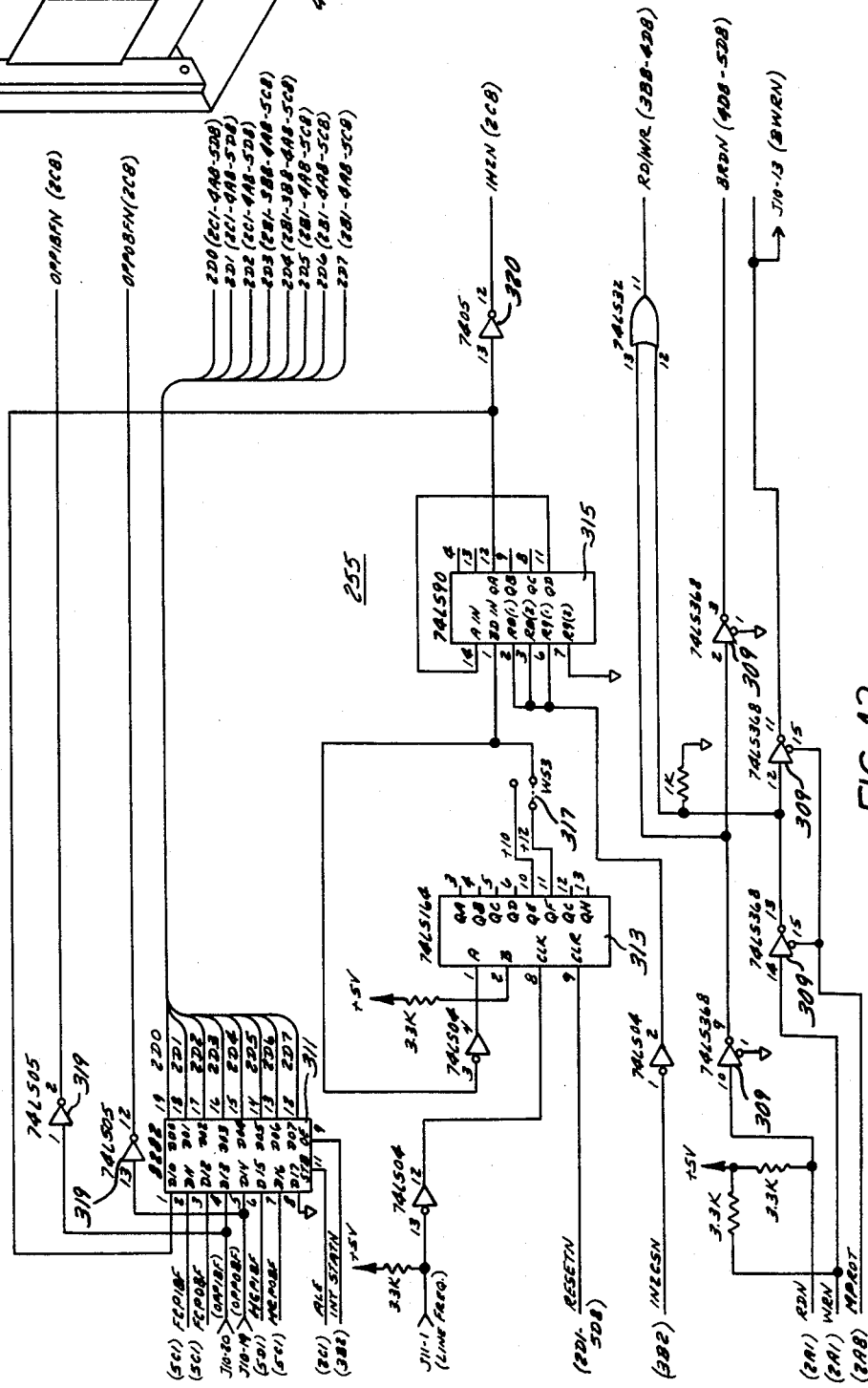
FIG. 13 is a schematic circuit diagram of the register section of the controller processor means.

Referring next to FIGS. 12 and 13, from time to time it will be necessary for the master microprocessor 261 to perform computations or other control functions in accordance with programs embodied therein and which relate to the status of one or more field data points. Accordingly a type 8282 interrupt register 311 is provided for receiving such signals and communicating them to the microprocessor during those time periods when the master processor 261 software, i.e., the computer programs embodied therein, permits it to sense signals at its interrupt terminal 290. The interrupt register 311 has connected thereto a type 74LS164 shift register 313 for providing a 5 Hz signal to a type 74LS90 counter-latch circuit 315. The counter-latch circuit 315 divides the incoming 5 Hz signal by five and provides an output signal once each second, the signal being latched until it can be acknowledged by the microprocessor 261. The 5 Hz signal is generated by the shift register 313 which utilizes a jumper 317 for selectively dividing the input frequency by 10 or by 12 so that a 5 Hz output results, irrespective of whether the conditioned incoming line frequency is 50 Hz or 60 Hz. As best seen in FIGS. 12 and 13, the interrupt register 311 stores the status of seven maskable interrupts during each bus cycle and communicates them to the microprocessor first maskable interrupt 290 through OR type 74LS05 open collector buffers 319 and a type 7405 open collector inverter 320.

Communications between the processor means 51 and the field interface means 53 and between the processor means 51 and an optional headend controller 14 is by a communications section 257 shown in FIGS. 8 and 12 to include a type 8041A/8741A master peripheral processor 277, a time-of-day circuit 321 incorporating a type MSM5832R5 clock chip 322, a type 14076B latching circuit 323 and an optional second peripheral processor 281. The master peripheral processor 277 provides the message formatting and decoding necessary to interface as a master microprocessor to external devices which use a compatible protocol. Such external devices may include other field interface means located within the network 12. Communications between the master peripheral processor 277 and external units may be by direct TTL gate connection using a serial format or by a compatible protocol modem. In order to provide a field programming capability for adding to or modifying the library of computer programs residing in the processing means 51, a portable programming unit (not shown) may also be connected to the TTL serial link 324 for the purpose of loading a data base into the processing means 51. In the alternative, programming may also be by a terminal unit constructed and arranged for the purpose or by the headend unit 14. Other details of the master peripheral processor 277 are set out below in connection with the description of the field interface means 53.

The master peripheral processor 277 controls a standby time-of-day circuit 321 having a latching capability for maintaining the correct time in the event of a power failure. The chip 322 comprises a CMOS device utilizing a crystal 325 of a selected frequency to provide a time base indicating seconds, minutes, hours, day of week, date, month and year. In a preferred embodiment, the crystal frequency is 32.768 KHz. The standby time-of-day circuit 321 is connected to the backup battery 62 for data protection in the event of power failure while the 4 bit latch circuit 323 is provided for address latching as data is being transferred.

The optional second peripheral processor 281 accomplishes the message formatting and decoding necessary to interface the processor 281 as a slave unit to systems using a compatible protocol. The processor 281 provides the serial data transmission and the clear-to-send or handshaking functions to facilitate interfacing the processor 281 and the modem interface 327.

Figure 10:
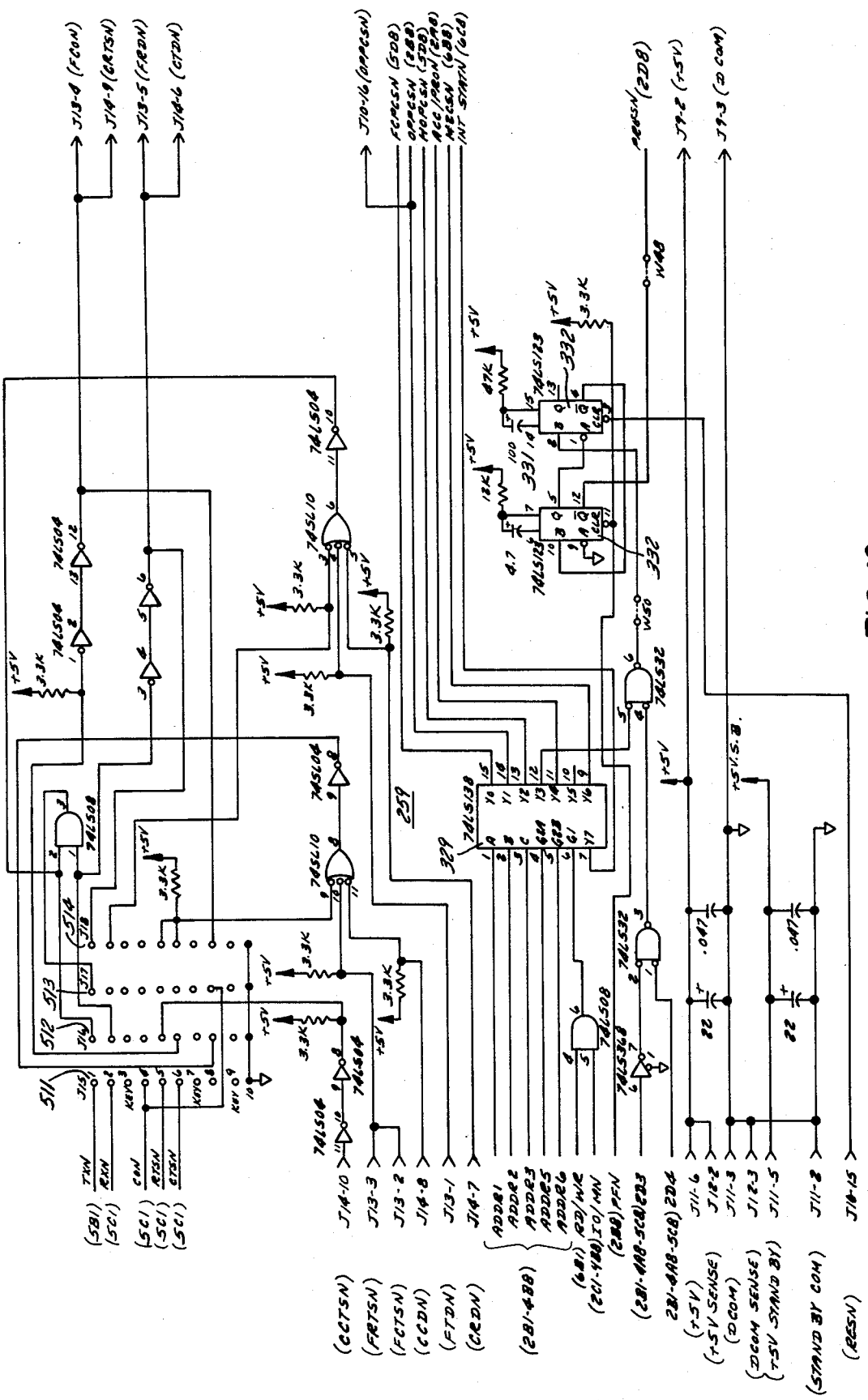
FIG. 10 is a schematic circuit diagram of the input/output decoder section of the controller processor means.
Figure 11:
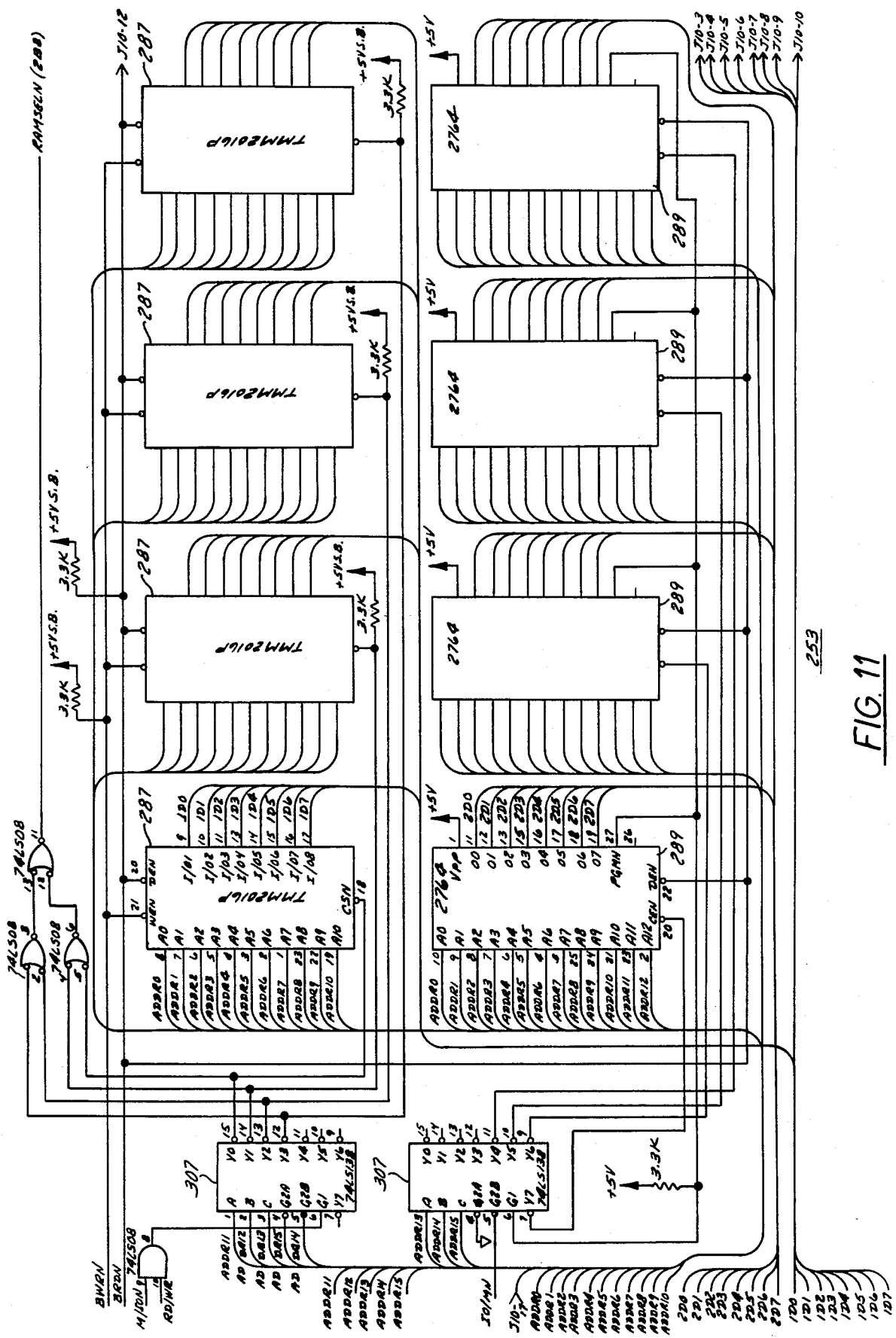
FIG. 11 is a schematic circuit diagram of the memory section of the controller processor means.

Referring to FIGS. 8 and 10, in order to facilitate the transmittal of properly addressed signals between the master microprocessor 261 and other portions of the processor means 51, the decoder section 259 includes an input/output decoder 329 of the 74LS138 type. In a preferred embodiment, the decoder 329 is capable of handling eight input/output address locations, seven of which are utilized. One address location is connected to a watchdog timer circuit 331 comprising a pair of type 74LS123 chips 332 and which is addressed once each second to retrigger an oscillator circuit contained therewithin. In the event that a time duration of more than one second elapses before the generation of a retriggering signal, the timer circuit 331 generates a reset signal once each second thereafter until recovery of the master microprocessor 261. Other address locations connected to the input/output decoder 329 include those related to the first peripheral processor 279 located on the operator panel means 57, the optional second peripheral processor 281 for connecting to a network system 12, and the master peripheral processor 277. Other address locations include those for resetting the one second timer interrupt counter latch circuit 315, for selecting the interrupt register 311 and for addressing the memory protection circuits 308 and 309.

Figure 14:
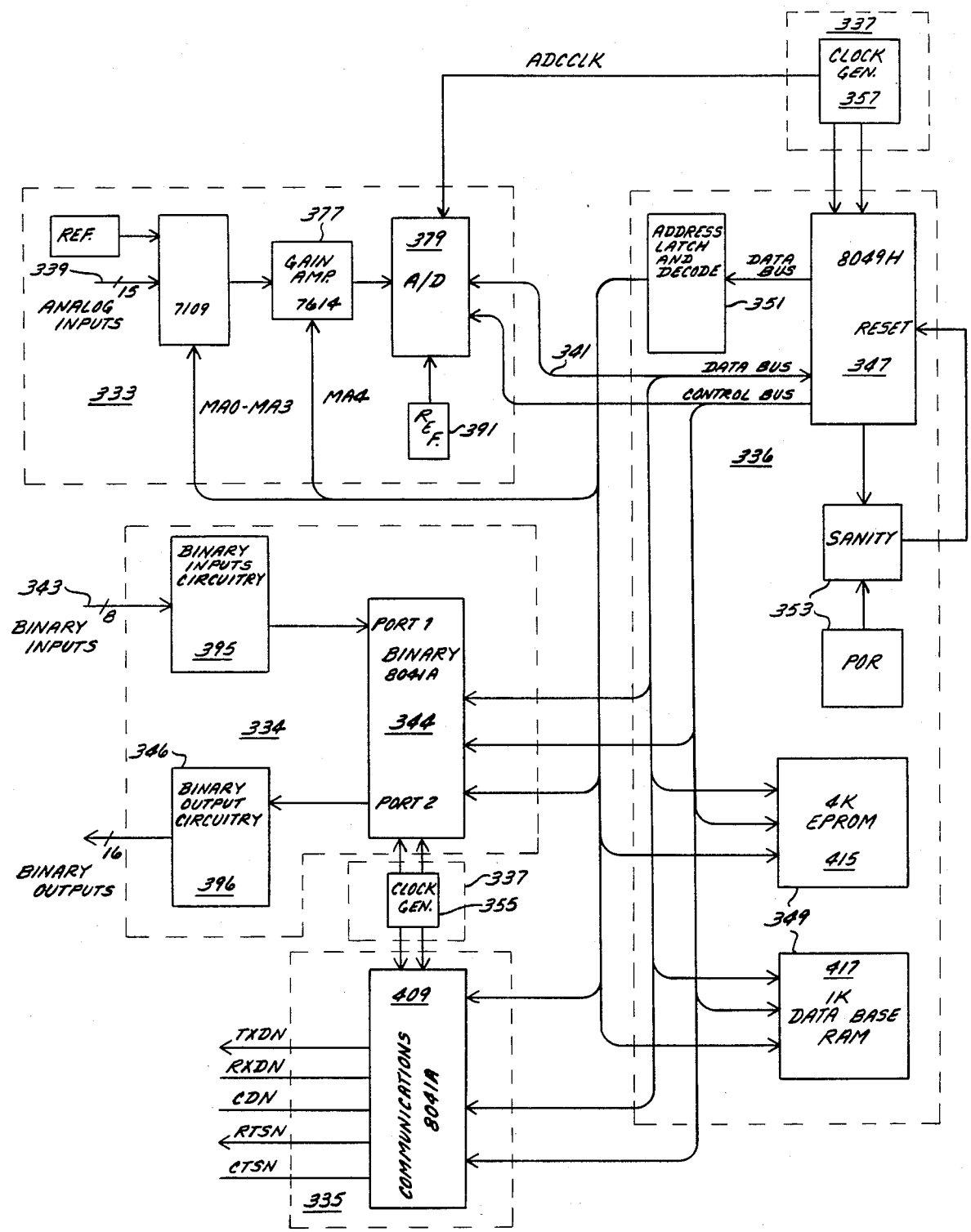
FIG. 14 is a simplified, block diagram of the controller field interface means.

Referring now to FIGS. 3 and 14, the field interface means 53 is shown generally to include analog interface means 333, binary interface means 334, communications interface means 335, internal processing means 336 and clock generating means 337 in two portions. Analog input signals 339 from field data points are directed to the analog interface means 333 for multiplexing and conversion to digital signals 341 which are directed to the internal processing means 336. A binary interface means 334 is provided for receiving a plurality of binary input signals 343 which may be programmed to represent any combination of contact status, pulse rate and-/or pulse count signals. A binary processing section 344 scans the binary input signals 343 and selectively transmits data received therefrom to the processing means 336. The binary output section 346 can be programmed to directly, digitally control any combination of relays, actuators and switches up to the limit of the number of outputs available. The communications interface means 335 operates in a protocol slave relationship to the master peripheral processor 277 of the processor means 51 and aids in the implementation of the system protocol for communication between the field interface means 53 and the processor means 51. The internal processing means 336 includes a field processor section 347 for controlling and for arithmetic processing of data received therein, the field processor section 347 being capable of performing both binary and BCD arithmetic and of accessing memory means 349 for performing program memory and data memory functions. An address latch/decode section 351 demultiplexes a portion of the external data or program address from the address/data bus as well as from other memory address lines and incorporates a three line to eight line decoder for detecting each state of a two bit device decode signal. A time pulsed reset circuit 353 is incorporated for forcing a computer program-initiated power-on-restart sequence in the event that a particular program fails to run or runs incorrectly. In order to synchronize the exchange of data between the various sections of the field interface means 53 and between the field interface means 53 and other portions of the system controller 10, a clock generating means 337 is provided and includes a first oscillator section 355 for driving the binary interface means 334 and the communications interface means 335 and a second oscillator section 357 for providing a clock signal used by the internal processing means 336 and by the analog interface means 333.

Figure 15:
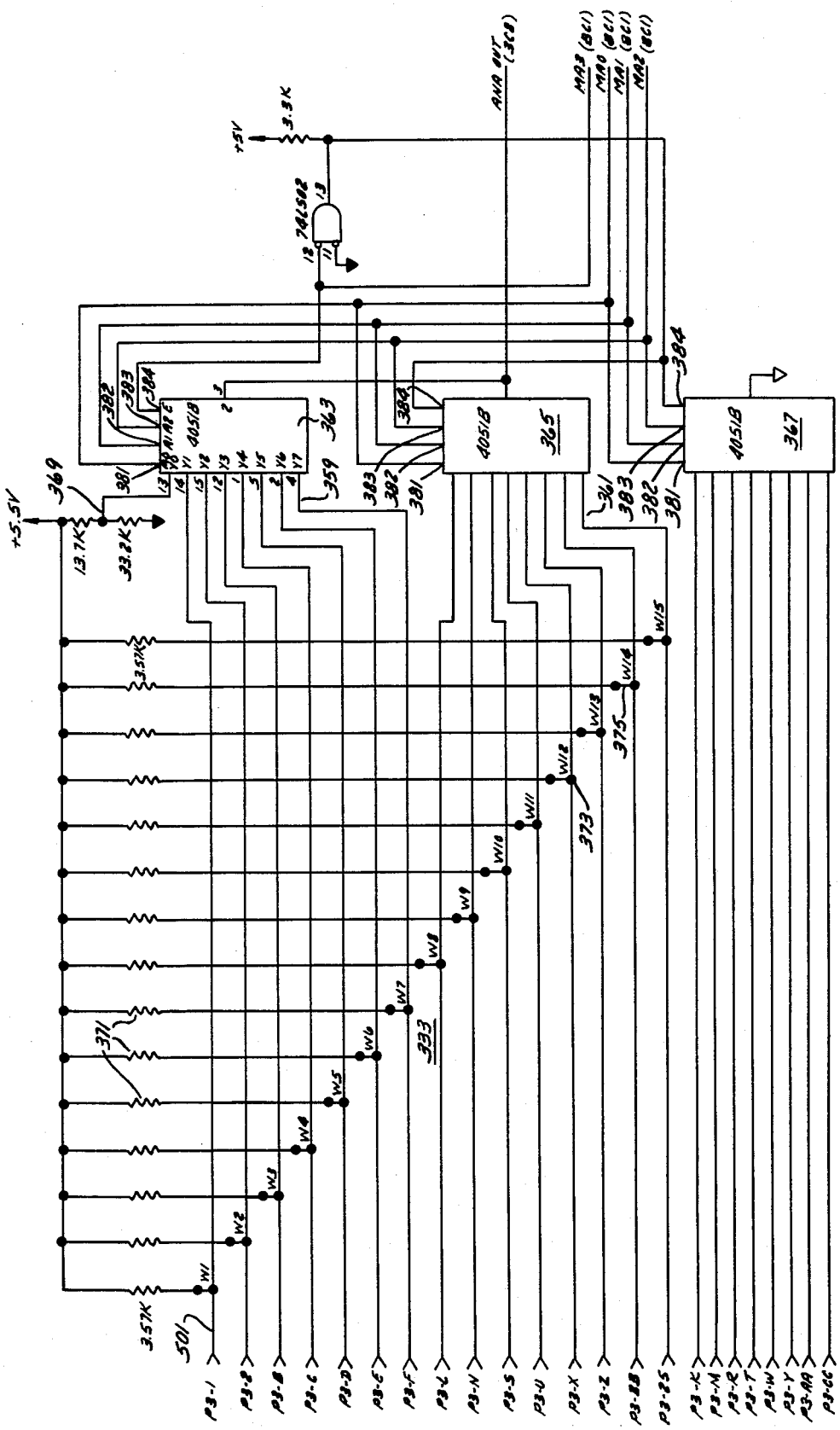
FIG. 15 is a schematic circuit diagram of the multiplex section of the controller analog interface means.
Figure 16:
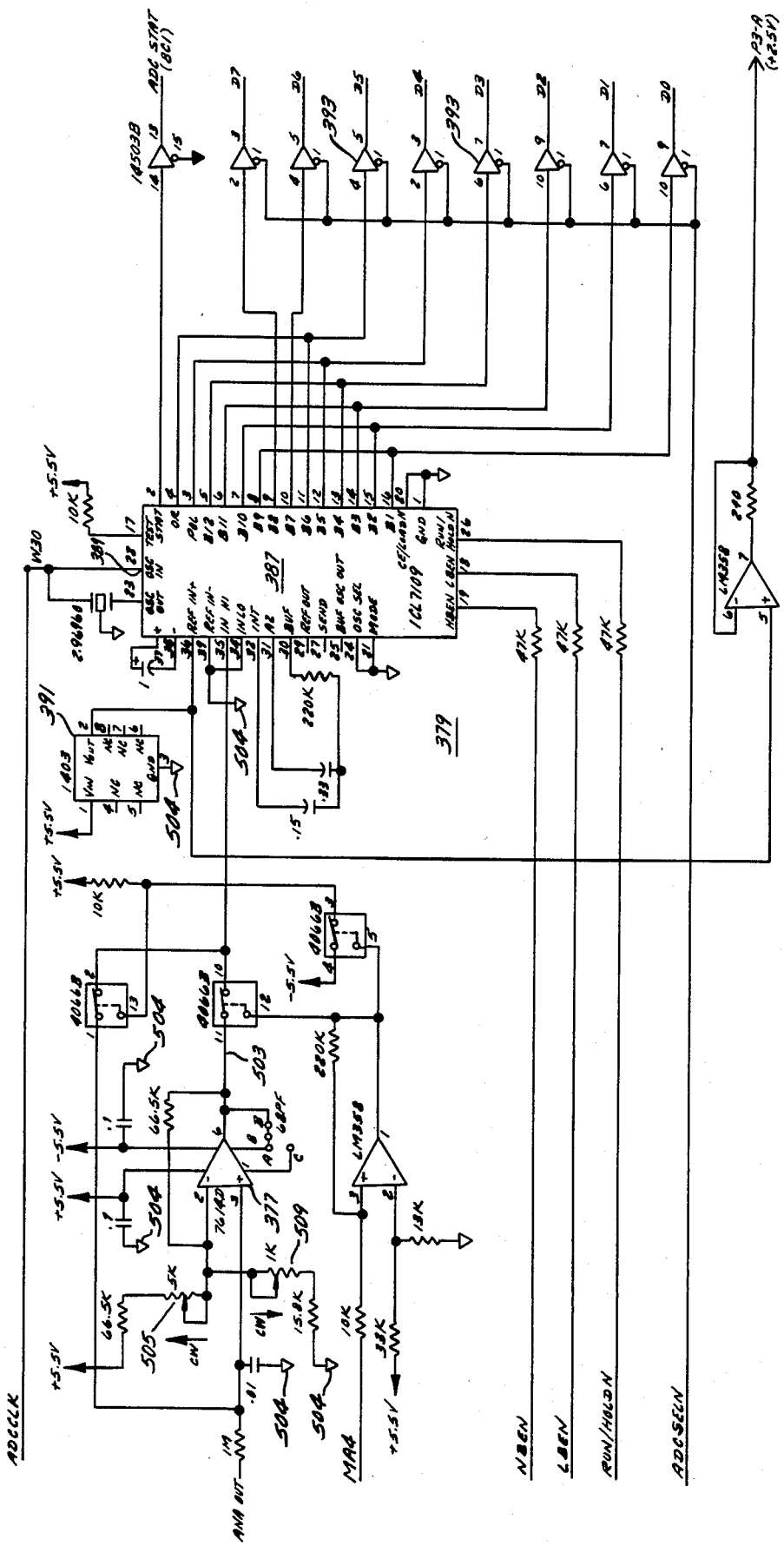
FIG. 16 is a schematic circuit diagram of the analog to digital converter section of the controller analog interface means.

More particularly and referring to FIGS. 14 and 15, the analog interface means 333 is shown to include a first group of inputs 359 and a second group of inputs 361, each being received from field data points. Inputs comprising the first group 359, eight in number, are single ended and are connected to a type 4051B first multiplexer 363 for conversion to a single first output. Those inputs comprising the second group 361, eight in number, are of the switched common type and are connected to type 4051B second and third multiplexers 365, 367 for conversion to a single second output. A first input 369, one of the first group of inputs 359, allows the field interface means 53 to continuously sample a reference voltage in the analog interface means 333, thereby monitoring the level of the supply voltage. In that manner, the value of the reference voltage is made available when the algorithm being processed requires the inclusion thereof as a voltage correction parameter. Signals introduced to the analog interface means 333 may be received from potentiometers, relative humidity indicators, temperature-indicating resistance thermal devices (RTD's) and the like (not shown). A plurality of 3.57K, ±1% resistors 371 is provided at all but one of the first group of inputs 359 and at that portion of the second group of inputs 361 connected to the second multiplexer 365, each resistor 371 having a first side thereof connected to a common bus and a second side terminated at a jumper jack 373 associated with each of the analog input lines. A jumper 375 is installed for each input line used to transmit a signal from an RTD temperature sensor and aids in the conditioning of sensor voltages, normally occurring in the range 0.9 V. to 1.7 V., to appear as an analog signal having a range of 0–5 V. As shown in FIG. 16, amplification to this preferred voltage span is by an operational gain amplifier 377, the output of which is directed to the type 7109 analog to digital converter section 379.

Each multiplexer 363, 365, 367 has first, second and third address terminals 381, 382, 383 for data signal reception and a fourth address terminal 384 for enabling signal reception. Each multiplexer 363, 365, 367 has connected thereto at its first, second and third address terminals 381, 382, 383 a plurality of address signal lines having signals thereon in binary code which are generated by the internal processing means 336. The address signals are used by the multiplexers to determine which one of the analog inputs 359, 361 is connected to the single output line at any given instant.

Referring to FIGS. 14 and 16 the analog to digital converter section 379 is shown to include a type 7109 converter integrated circuit 387 having a connection 389 from the second oscillator section 357 coupled thereto for synchronization and a type 1403 voltage reference chip 391 for generating a 2.5 volt reference voltage. The digitized outputs of the circuit 387 are directed to the internal processing means 336 by a plurality of type 14503B buffer amplifiers 393 connected to the eight line data bus. Each buffer amplifier 393 is capable of driving one standard transistor transistor logic (TTL) load and is capable of tri-state control, i.e., of providing outputs of a specified maximum low voltage and of a specified minimum, higher voltage for logic states "0" and "1" respectively and of providing a high impedance state when deactivated. The amplifiers 393 assure that the signals introduced into the data bus are at the proper voltage levels which, in a preferred embodiment, are 0.4 V. maximum for a logic "0" and 2.7 V. minimum for a logic "1". Signed data is transmitted to the internal processing means 336 by a twelve bit digital signal together with a sign bit.

Figure 17:
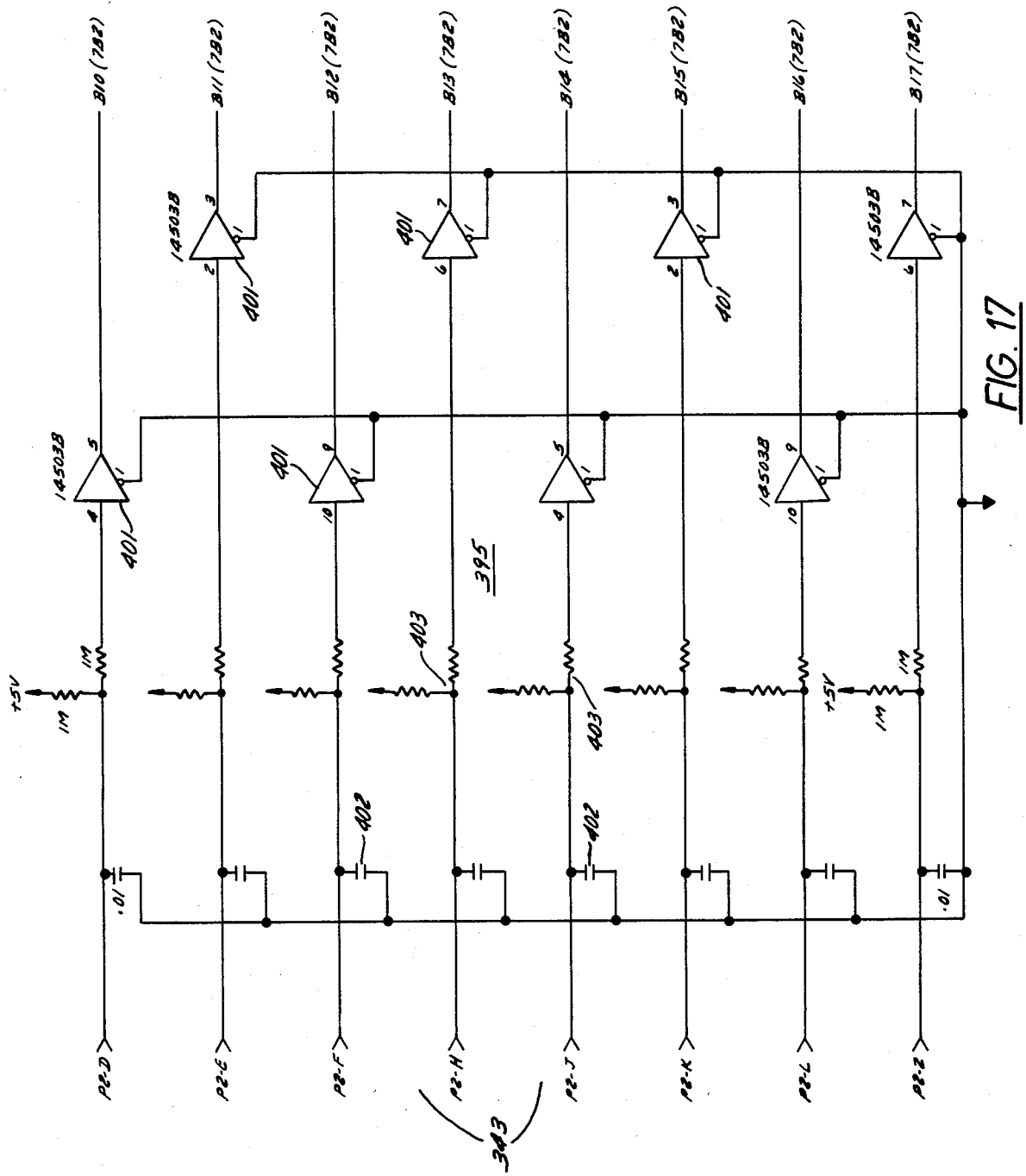
FIG. 17 is a schematic circuit diagram of the binary input section of the controller binary interface means.

The binary interface means 334 is shown in FIGS. 14, 17, 18, 19, 20 and 21 to include binary input, binary output and binary processing sections 395, 396 and 397 respectively. As best seen in FIG. 17 the binary input section 395 is shown to include a plurality of binary input points 343, preferably eight, each of which is capable of sensing the state of a nonenergized, nongrounded Form A contact or square wave pulse signals in the +5 V. to +10 V. DC range. Signal conditioning circuitry comprising type 14503B input buffers 401, capacitors 402 and resistors 403 helps avoid conductivity-impairing relay contact filming or polymerization while at the same time presents a high impedance for voltage inputs. After it is known whether a particular input point 343 will be used to sense contact status, pulse count or pulse rate, the computer program software is configured to achieve the desired result. For input points 343 used to sense relay contact status, it is preferable to configure the software to provide an anti-bounce feature, i.e., to require that contacts be open or closed continuously for a predetermined minimum time before the status is sensed. When an input point 343 is used as a pulse count input, the programming is configured to provide an accumulator input that is restricted to copying changes of either Form A contact status or voltage level inputs from a pulse train at a relatively low input transition rate. If an input point 343 is desired to be used as a pulse rate input, a preferred software configuration permits the selection of one of two scan rates to determine the rate of change of a voltage pulse train having a relatively high transition rate such as may emanate from a flowmeter.

Figure 18:
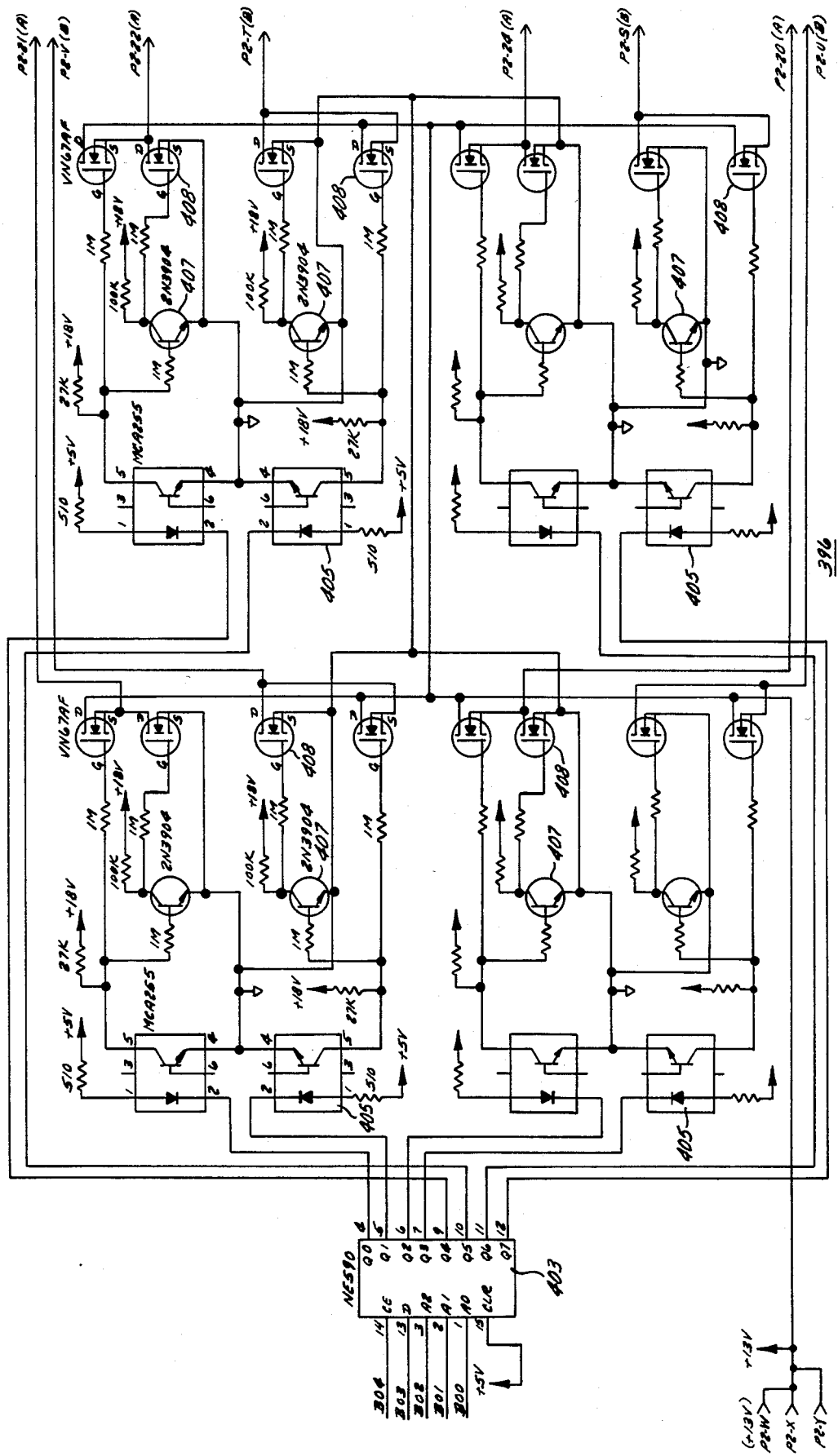
FIG. 18 is a schematic circuit diagram of a first portion of the binary output section of the controller binary interface means.
Figure 19:
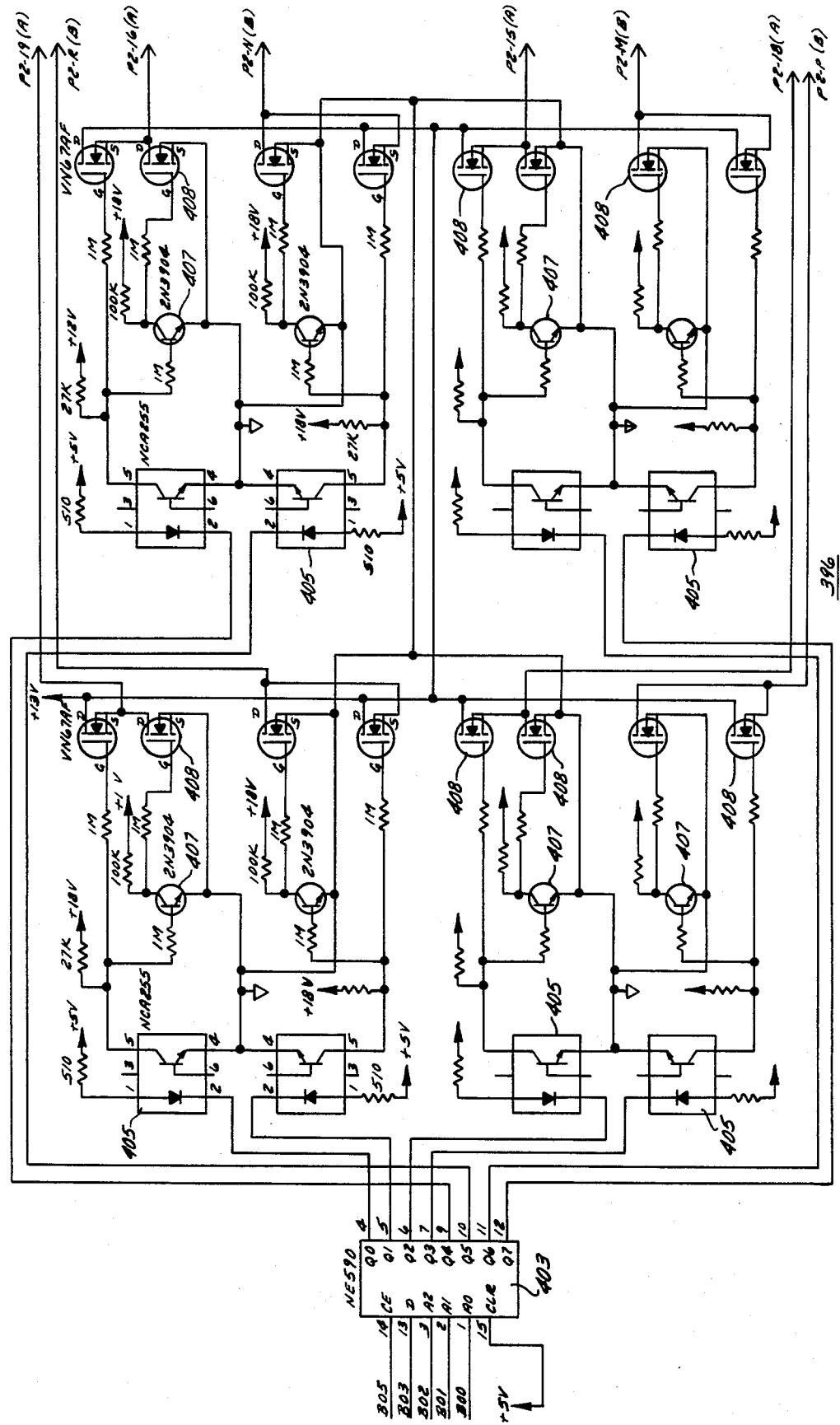
FIG. 19 is a schematic circuit diagram of a second portion of the binary output section of the controller binary interface means.

The binary output section 396 is best shown in FIGS. 18 and 19 and includes a pair of type NE590 addressable latch circuit chips 403 for receiving address, DATA and SELECT active low signals from the binary processing section 344. A logic "0" at one of the outputs of a latch circuit chip 403 will bias the appropriate type MCA255 optical isolator 405, the logic signal of which is directed to a type 2N3904 inverter transistor 407 and thence to a type VN67AF VMOS switch 408 for ensuring that both of the two VMOS switches 408 comprising a related pair, which are in series with the external power supply, are not simultaneously switched to the ON state. By logically combining these signals with those from two other companion VMOS switches 408 comprising a related pair, the direction of flow of the binary output current may be reversed.

Figure 21:
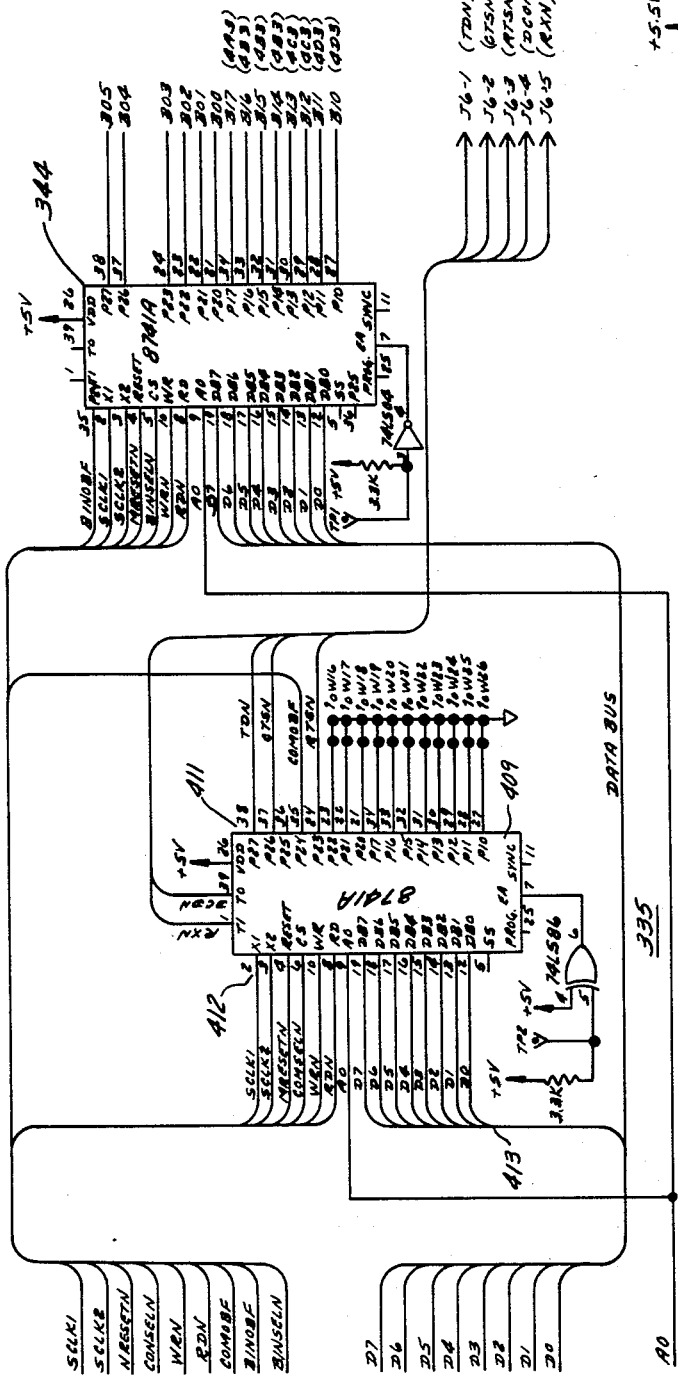
FIG. 21 is a schematic circuit diagram of the communications interface means of the controller field interface means.

Referring next to FIGS. 14, 17 and 21 a binary processing section 344 is provided and continuously scans all binary input points 343 simultaneously and at high speed which, in a preferred embodiment, is about once each millisecond. Each detected change of state of each input point 343 causes an internal count to be incrementally modified. The state and count are examined at regular intervals by the programmed binary input scan routine residing in the internal processing means 336 with changes in the state and count being transmitted to the processor means 51 upon command.

The communications interface means 335 is in bus slave relationship to and therefore is a device peripheral to the field processor section 347 of the internal processing means 336 and includes a type 8041A/8741A communication microprocessor 409 arranged in a communications protocol slave relationship to the master peripheral processor 277 for effecting communications between the processor means 51 and the field interface means 53. The communications interface means 335 digitally builds and disassembles message headers, performs check digit error computations, decodes and executes commands issued by the internal processing means 336 or from the bus master and interrupts the latter when the field interface means 53 has received and identified a valid communications message intended for the internal processing means 336. Data bus lines 413 and control bus lines 412 are provided thereto while output lines 411 are directed to the master peripheral processor 277.

Figure 20:
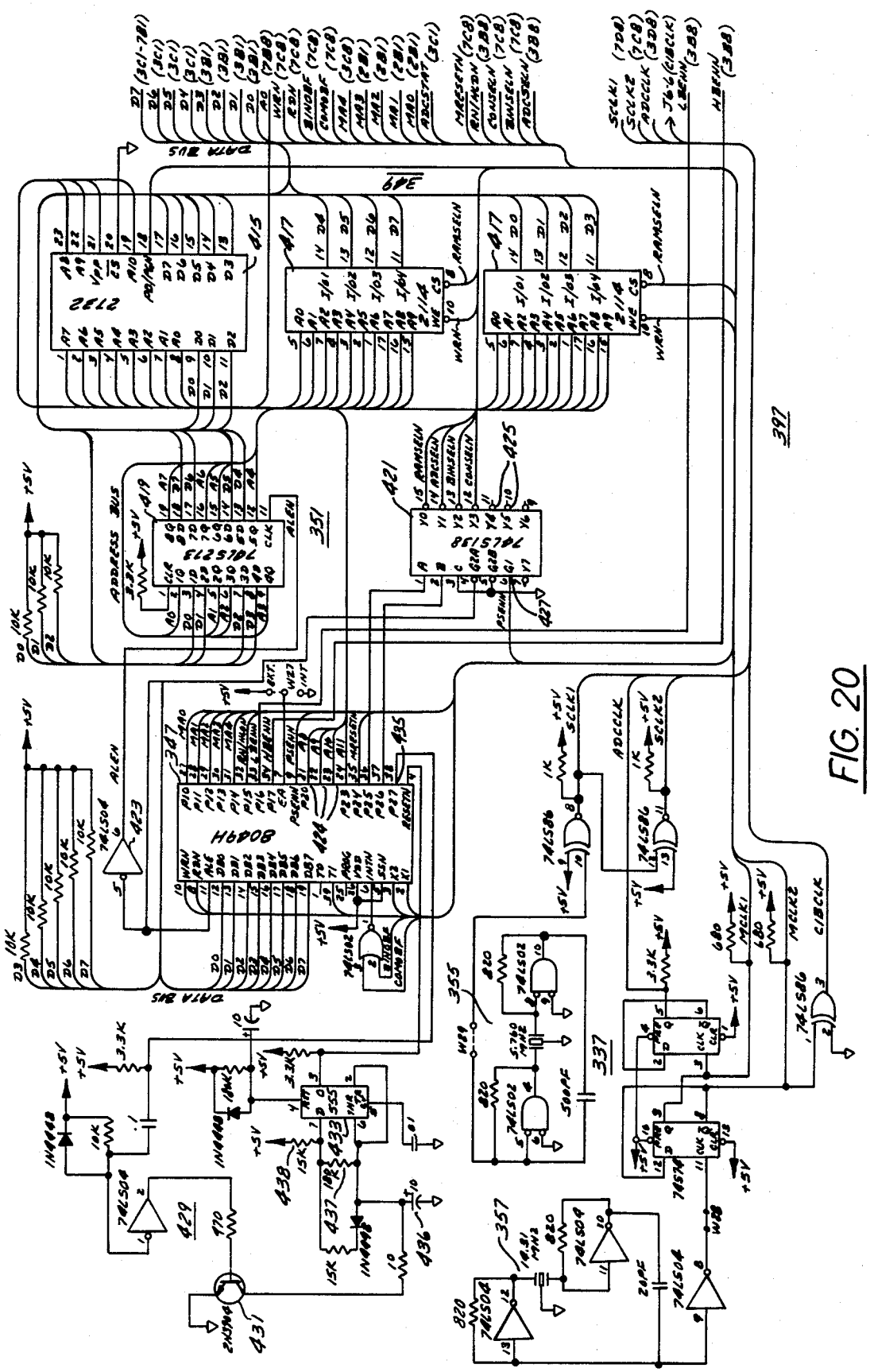
FIG. 20 is a schematic circuit diagram of the internal processing means of the controller field interface means.

Referring next to FIGS. 14 and 20, the internal processing means 336 is shown to include a type 8049H 8 bit microcomputer field processor section 347 having internal memory capability and external memory means 349 for performing program and data memory functions. A total of 27 input/output lines are provided together with an 8 bit timer/event counter. Even though the field processor section 347 has an internal 2K bytes of ROM, this capacity is insufficient for the construction of the preferred embodiment and the internal memory is supplemented by memory means 349 including a type 2732 external EPROM 415 having 4K bytes of memory capability. The internal RAM data memory section of the field processor section 347, 128 bytes including 64 user definable bytes, is supplemented by a pair of type 2114 RAM units 417 providing an additional 1K bytes of RAM capability. Special instructions are preferably incorporated into the firmware for performing binary and BCD arithmetic functions, table search functions, loop counting and intelligent control of the 8 bit bidirectional parallel data ports of the field processor section 347. The internal processing means 336 also includes an address latch/decode section 351 having a type 74LS273 address latch chip 419 and a type 74LS138 three line to eight line decode chip 421. The latch chip 419 demultiplexes the lower eight bits of the external data or program address from the address-/data bus. It is preferred that this address information be clocked from the data bus on the falling edge of the ADDRESS LATCH ENABLE pulse and, accordingly, a type 74LS04 inverter 423 is connected between the appropriate pin of the field processor section 347 and the latch chip 419 for the purpose. The upper four bits of the data or program address are accessed at pins 424 of the field processor section 347. The decode chip 421 decodes the memory address lines 425 together with the PROGRAM STORE ENABLE control signal line 427 to derive the necessary information for decoding the analog interface means 333, the communications interface means 335, the binary interface means 334 and the data base circuitry of the static RAM units 417. The decode chip 421 may be disabled by the program software residing in the field interface means 53 for preventing communications with any of the aforementioned circuits during those periods when program memory is being accessed. Similarly and with reference to the aforementioned circuits, it is preferable to configure the software so as to prevent communications with the remaining circuits when any one of them is being accessed.

On occasion, the field processor section 347 may fail to execute a program or may cause a program to be incorrectly executed. Such a malfunction could occur due to the presence of spurious electrical noise within a system or for other reasons and could cause the system controller 10 to malfunction. FIG. 20 depicts a time pulsed circuit 429, sometimes termed a sanity circuit, comprising a type 2N3904 transistor 431 for repetitively pulsing a type 555 monostable one-shot multivibrator 433 and functions as an internal guard circuit. This configuration requires that the field processor section 347 pulse its input/output port line 435 within a time predetermined by the values of the capacitor 436 and the resistors 437, 438 comprising an RC network. This time is preferably between about three and four seconds and, upon a rate determined by the RC network, the sanity circuit 429 will force a power on restart sequence to be initiated by the computer program software residing in the field processor section 347 of the field interface means 53. The circuit uses, as one of its inputs, the rising edge of the +5 V. power supply line to force the execution of the power-on restart sequence.

It is preferred that signal sensing, processing and command functions be performed in synchronization. Additionally, it is preferred that the communications interface means 335 be synchronized with a signal in accordance with its predetermined design frequency necessary for generating baud rates. Accordingly, FIG. 20 depicts clock generating means 337 having a first oscillator section 355 and a second oscillator section 357. The first series resonant oscillator section 355 generates a clocking signal at 5.760 MHz and drives the binary input and output sections 395, 396 and the communications interface means 335 in a two phase push-pull configuration. The second series resonant oscillator section 357 generates a signal at 14.3181 MHz which is divided by two to provide a 7.159 MHz two phase push-pull clock for use by the internal processing means 336 which requires a clocking signal at two times color burst frequency. The output of the second oscillator section 357 is also divided by four to provide a clocking signal of 3.579 MHz, the color burst frequency, for use by the analog to digital converter section 379.

Figure 22:
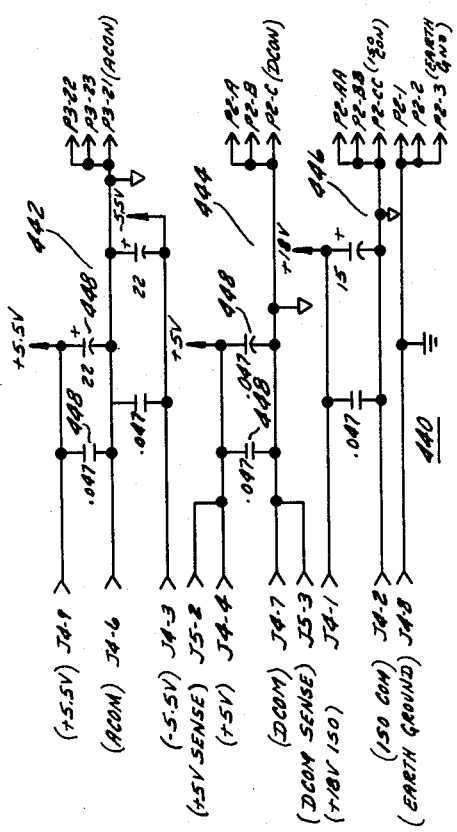
FIG. 22 is a schematic circuit diagram of the bulk board decoupling network of the controller field interface means.

As shown in FIG. 22, a bulk board decoupling network 440 is provided for isolating electrical noise from the regulated power assembly 47 from the remaining circuitry and includes an analog decoupling section 442 for driving the analog interface means 333 and a binary decoupling section 444 for driving the binary processing section 344, the binary input section 395 and the latch circuit chips 403. An isolated binary decoupling section 446 drives that portion of the binary output section 396 which is powered by the isolated DC supply 202. Selection of the capacitors 448 in a known manner will result in the rejection of both high and low frequency noise.

Referring now to FIGS. 3, 8 and 23, the operator panel means 57 is the primary device for providing control and monitoring communications between a human operator and the system controller 10 when the controller 10 is functioning in a standalone mode on a local basis, as in FIG. 2, and may be used to access data when the system controller 10 is used in a network mode with a headend unit 14. The structure of a preferred panel means 57 is shown to include a type 8041A/8741A programmable first peripheral processor 279 functionally related to the processor means 51, a first clock buffer section 303 interfaced between the second clock generator 275 of the processor means 51 and the processor 279, an address decoder section 439, a keyboard 441, a keyboard section 443 interfaced with the decoder section 439 and a display section 445 for visually indicating the various operating parameters and functions. The first peripheral processor 279 exchanges data with the processor means 51, permits special editing functions to be performed, reads the keyboard section 443 and controls the display section 445. More particularly and as best seen in FIG. 23, data transfer between the internal single byte buffers of the peripheral processor 279 and the processing means 51 is by a bidirectional, tri-state eight bit port 447 which provides communication along the eight bit data bus connected therebetween. In addition to the data transfer connections, the peripheral processor 279 has several control and timing connections coupled thereto including a connection 449 from the clock buffer section 303 for providing a clock signal from the second clock generator 275 at a predetermined minimum voltage. A system first reset connection 451 provides an active low reset signal which enables resetting of the first peripheral processor 279 while output line connections 453 and 455 are controlled by software residing in the first peripheral processor 279 for indicating the status of the internal output buffer and input buffer. A reading signal connection 457, a writing signal connection 459 and a chip selecting connection 461 cooperate for controlling those times when the data bus is to be read or written to by the processor means 51. When the connections 457 and 461 are at logic "0", the data bus is available to be read by the processor means 51 and when connections 459 and 461 are at logic "0", the data bus is available to be written to by the processor means 51. A second reset connection permits the operator to request a system reset by depressing the reset button of keyboard section 443 whereupon the first peripheral processor 279 transmits a reset message to the processor means 51 via port 447. An address input 465 is utilized by the processor means 51 to select either the internal eight bit status register or the internal output buffer of processor 279 when the processor means 51 is sending signals thereon.

Signals entering the first peripheral processor 279 from the processor means 51 are directed from the former via its second output port 467 to a three line bus and thence to a three line to eight line address decoder section 439 utilizing a type 74LS138 decoder chip 469 and which determines, by the address encoded upon each signal, whether each of the received signals is to be directed to one of six DL7751 segment-type displays 471 or to one of eight light emitting diodes 473 (LED's). Additionally, the decoder section 439 functions to selectively connect the keyboard section 443 to the first input/output port 475 of the first peripheral processor 279.

A buffered keyboard section 443 is provided whereby an operator may interface with the controller 10 and in a preferred embodiment includes a buffer 441 and a sixteen-key keypad 477 arranged in a 4×4 matrix array. The first peripheral processor 279 is capable of determining the status of each key by sensing the logic state of each of a first group and each of a second group of connections at its first port 475 and comparing the states so sensed. The logic state of each of the four vertical rows of keys in the matrix is established by a signal through one of the type 74LS05 buffer amplifiers 479 while the logic state of each of the four horizontal rows is established by a signal through each of the type 74LS01 buffering address enablers 481. The signals may also be directed to the LED's 473 or to the segment-type displays 471 directly from the first peripheral processor 279. That is, after a display has been selected by depressing appropriate keys, signals from the first peripheral processor 279 drive an appropriate one of the displays 471 through one of a type 75452B Darlington transistor-buffer 483 to generate the desired character. Each display 471 is multiplexed, i.e. refreshed at a rate sufficiently rapid to give the appearance of a constantly illuminated display message.

The display section 445 is arranged to a group of eight digitally-indicating LED's 473 for indicating the operating mode and status of the system controller 10, a two digit seven segment display 485 for specifying the function being addressed by the operator's panel and a four digit seven segment display 487 for indicating the addressed function value or binary state.

It is preferable that the operator panel 57 be decoupled from the +5 V. portion of the regulated power assembly 47 and, accordingly, a bulk decoupler circuit 489 is provided and has a first high frequency bypass capacitor 491 and a second low frequency bypass capacitor 493 in parallel therewith. The low frequency capacitor 493 preferably has a capacitance adequate to momentarily maintain power supply voltage in the event of a brief interruption thereof and in a preferred embodiment is 22 mfd. In order to reduce the presence of unwanted spurious signals, it is also preferable that each static switching device incorporate a noise-reducing bypass capacitor (not shown) selected and connected between its +5 V. terminal and the DC common bus in a known manner.

When constructed and arranged in the manner shown and described, the operator panel 57 permits an operator to query the status of each of a plurality of functions, to receive displayed information regarding those functions and to instructively modify functions, all in accordance with particular program routines. One example of a function accessible to the operator is that of self-test whereby the operator may visually check the operation of numeral and digital indicating luminaries such as the segment displays 471 and LED's 473. As another example, the operator may wish to query the setpoint of a particular room thermostat and may also wish to determine the actual temperature within that room. Since a particular setpoint and a particular temperature value may each be identified by a function number recorded on a table available to the operator, the operator may select these values for display by function number and, further, may instructively modify the setpoint within a range of setpoints predetermined by a particular program routine. Examples of other functions, the status of which may be interrogated, displayed and modified by the operator, include enthalpy, humidity and comfort index functions. The operator may also determine the binary status of functional field data points comprising, for example, the open or closed position of a remote door lock or of a toggle switch of a fan motor starter. However, the programming is preferably configured to prevent the operator from changing a value of a setpoint beyond predetermined limits or from changing the status of a binary point unless that function is pre-identified for permitting function change or new value entry. Additionally, the programming preferably precludes system reset by the operator unless one of the LED's 473 designated as a trouble lamp is illuminated.

Figure 24:
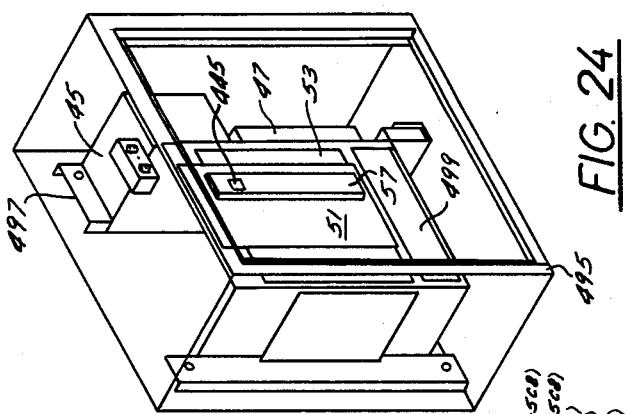
FIG. 24 is an isometric view of the controller enclosure and panel arrangement with portions shown in phantom.

Referring next to FIG. 24, it is preferable for protection of the internal components of the controller 10 and for ease of wiring thereof that the controller 10 be housed in an enclosure 495 adapted to receive the processing means 51, the field interface means 53, the power section 45, the power assembly 47 and the operator panel 57 in spaced apart relationship. A wiring duct 497 is constructed and arranged to receive wiring bundles entering the upper right corner of the enclosure 495 and extending downwardly for coupling to the aforementioned subcomponents or, preferably, to an optional field terminal board 499 having edge strips for electrically connecting to subcomponents and terminal connectors for attachment of the conductors comprising the wiring bundles. A lockable enclosure door (not shown) is preferably equipped with a transparent panel for permitting viewing of the display section 445 while at the same time protecting the keyboard section 443 from unauthorized use.

Referring to FIGS. 3 and 10, there is provided a plurality of multi-pin jacks comprising processor jack 511, field interface jack 512, monitor jack 513 and portable programming unit jack 514. In normal operation, a multiple conductor cable 510 is plugged between jack 511 and 512 for permitting communications between the processor means 51 and the field interface means 53. A system diagnostic unit (not shown) may be plugged to jack 513 for monitoring communications between the processor means 51 and the field interface means 53. Additionally, a portable programming unit (not shown) may be plugged to jack 514 for programming the processor means 51. The system diagnostic unit may also be permitted to communicate with the field interface means 53 by removing the cable 510 and plugging the diagnostic unit to jack 512 or, by plugging the diagnostic unit to jack 511, the function of the field interface means 53 may be emulated.

Any program to be developed for use with the system controller 10 preferably includes four components comprising field point definition, data point definition, control process formulation and operator panel function formulation. That portion of the program related to field point definition will reside in and specify the operations to be performed by the field interface means 53 for converting sensor information and for controlling outputs. It is to be appreciated that while the field point definitions function to configure the operations to be performed by the field interface means 53, a data base for those points is maintained in the processor means 51.

By communications between the processor means 51 and the field interface means 53, the field interface means program is downloaded from the processor means 51, control commands are issued to the field interface means 53 and, in turn, the portions of the processor means data base related to point status is updated by the field interface means 53 as required. Thus, a point definition generates an element of the field interface means program and a point location within the processing means memory which is identified and accessible to the processing means control routines.

Hardware or field equipment points to be recognized for creating the field point definitions comprise binary and analog input, binary output and control point types. Of the binary input types, these may be classified as contact status, pulse count and pulse rate types. Analog input points may be further segregated into limited range, full range, rate input and count totalization points. The binary output points are connected to field equivalent devices of the two state (ON/OFF) or three state (FUNCTION/HOLD/REVERSE FUNCTION) type which is switched by a +12 vdc control drive from the system controller 10. This switched drive is used in conjunction with a separate external +12 vdc power supply (not shown). The binary output points may be segregated to comprise relay control, actuator and electrical switch points.

Control points, of which there may be seven types, are defined within the program, have no direct connection to field equipment and cooperate with other points to achieve the desired function. It is preferable to utilize programming to define control points comprising binary and analog interlock, incremental control, and binary output with feedback. Actuator position, proportional control and supervised analog interlock types may also be defined.

The system controller supports two types of data points, namely, binary and analog. Data points are defined by specifying the memory storage locations of computed variables used by the program and/or by a network headend unit 14. Control process formulation defines the control logic and computational operation of the controller 10 to implement monitoring, system control and energy management functions while the generation of operator panel functions defines those parameters available to the user at the operator panel 57.

Programming of the controller 10 is preferably by selecting from a library of functions including utility, mathematical control, energy conservation and time program functions. Examples of utility functions include process entry, variable adjustment, alarm identification and keyboard control. Process entry will preferably include entry by time and event together with exit and restart functions while variable adjustment will include routines for adjustment of start/stop outputs, analog set points and selected memory values. Alarm identification defines alarm conditions for both fixed values and for deviations while keyboard control routines permit programming of the display, scan, override and adjustment capabilities of the operator panel 57 and its display section 445.

Mathematical routines will preferably include those related to arithmetic, binary logic, relational logic and a plurality of fixed formulas for providing discrimination between high and low signals, averaging, summing, rate of output signal change and for computing values of, for example, dewpoint and enthalpy. Fixed decimal point mathematics, rather than floating point, are preferable for use in the controller 10 since the numerical values to be manipulated will be in a known general range and more rapid algorithmic treatment and less required memory capacity will result. Control routines will preferably include those for signal compensation as related to signal anticipation delay and adjustment of deadband width and location. Other control routines will preferably include those related to loop control for proportional, incremental, multiple staging and/or manual-off-automatic control, all for the purpose of providing proportional proportional integral and/or proportional integral derivative control according to the dictates of the specific application.

The library of functions will also preferably include functions directed to energy conservation such as, for example, a running time routine permitting formulation of optimal starting and duty cycle routines. It is also preferable to include time program functions as, for example, to provide a predetermined delay on restart or the time interval(s) for repeating other routines.

A wide variety of control process formulations can be generated within the controller's application program and each will comprise a sequence parameterized library of routine calls including entry, application and unconditional exit routines. That information required to identify each controlled process includes control process and routine numbers, together with a mnemonic identification of the routine name or type and the routine parameters. A user may prepare one or more programs by selecting certain routines from a library of mnemonically identified routines and programs so prepared are stored in the battery-backed RAM defined by the first memory units 287.

The operator panel 57 functions allow the system designer to specify a limited set of operations which can be performed from the keyboard section 443. The functions are preferably identified to the user by a number, 00-99, and require either a one or two step entry procedure. The first step selects the function and involves the entry of a two digit function number. For those routines that involve only a display operation, this is the only step required and will result in the display of the programmed data. For those functions involving an adjustment of status or value, a second step is performed wherein a value is entered by depressing appropriate numbered keys and subsequently depressing the key causing the value to be entered.

It is also preferable that the programming and components of the system controller 10 be arranged for providing self-test diagnostics and controlled restart. For example, one of the LED's 473 may be caused to be illuminated when a datum point being monitored exhibits a parameter which exceeds a predetermined limit. Additionally, it is preferable to include flags to accompany data messages to indicate whether such data is reliable and, if not, cause the processing of the message using the last-transmitted reliable data or, in the alternative, replace the unreliable data with a preselected default parameter. In the event of a power failure, it is preferred to force the execution of preselected program routines prior to replacing the controller 10 fully on line.

In order to obtain optimum performance from the system controller 10, it is preferred that certain installation and field data point parameters be observed. Due to the adverse effect of capacitive coupling and noise pickup, the maximum length of the cable carrying binary input signals into the system controller 10 from contact status, count totalization and pulse rate points is recommended not to exceed 1000 feet of No. 22 AWG twisted pair wire. Any shielding used for the former two types of points shall be grounded only at the controller 10. The use of shielding is preferred for wiring carrying pulse rate point signals and such shielding should likewise be grounded only at the controller 10. Regarding cables carrying analog input signals, those employed for temperature signals should not exceed 250 feet of No. 18 twisted pair with a shield terminated only at the controller 10. For potentiometer inputs, the preferred maximum cable length is 250 feet of two or three conductor No. 18 twisted and shielded wire. Shielding of three conductor cable should be terminated only at the controller 10 while that for two conductor cable should be isolated and used as the potentiometer third conductor. The length of cables carrying voltage transducer and current transducer signals should not exceed 500 feet of No. 18 twisted, shielded pair with shielding terminating only at the controller 10. The length of cable transmitting voltage transducer signals to the processor means 51 should not exceed 250 feet of three conductor No. 18 twisted and shielded wire with shielding terminating at the controller 10 only. Regarding cables used to carry signals of the binary output type, the length of those used for momentary output signals should not exceed 480 feet of No. 18 twisted pair. Those used for position output signals should not exceed 50 feet while those used for maintained output signals should not exceed 1,000 feet, all of No. 18 twisted pair conductor. Optional shielding is preferably terminated only at the controller 10. All control wiring within the controller cabinet is preferably routed in an enclosed channel separate from power wiring.

For contact sensing, the open circuit resistance is preferably greater than 10 M ohms while the closed circuit resistance is preferably less than 100 K ohms. For voltage sensing and a buffer output logic value of "1", the field terminal inputs should preferably be between +3.6 VDC and +10.5 VDC and for a buffer output logic value of "0", the field terminal inputs should be between −0.5 VDC and +1.4 VDC. The input resistance between a field terminal and common should be greater than 450 K ohms. The range of preferred transition rates for 50% duty cycle service are, for contact status inputs, 0 to 4 PPS; for pulse count inputs, 0 to 4 PPS; for pulse rate inputs at 0.8 sec. scan rate, 1.25 to 315 PPS; and for 2.04 sec. scan rate, 0.5 to 125 PPS.

After preparing and loading the computer program and prior to placing the controller 10 in operation, it is desirable to calibrate the analog interface means 333 in order to use the 12 bit capability of the analog to digital converter over a 0–5 V. range of input voltage. Referring to FIGS. 15 and 16 and with precision power supplies calibrated to ±5.5000 V. ±0.1 MV. and having an output impedance less than 660 ohms and a precision digital voltmeter, the following steps should be performed:
  1. Provide an EPROM programmed to scan, with gain, point 501 of FIG. 15;
  2. Ground point 501.
  3. Place the voltmeter probes between point 503 and any point 504, Analog common, of FIG. 16;
  4. Adjust potentiometer 505 to a voltmeter reading of −5.2805 V.±0.1 MV.;

5. Remove ground from point 501 and apply a voltage of 1.6999 V.±0.1 MV. to point 501;
6. Adjust potentiometer 509 until the outputs B1–B12 of converter integrated circuit 387 read 4095 counts;
7. Apply a voltage of 0.8732 V.±0.1 MV. to test point 501;
8. Adjust potentiometer 505 to obtain a zero count from circuit 387 and repeat steps 5–8 until readings are within 0.5 MV.;
9. Seal potentiometers 505 and 509.

While only a preferred embodiment of the invention has been illustrated and described, it is not intended to be limited thereby but only by the scope of the appended claims.

We claim:

1. A low level microprocessor based system controller comprising:
    power supply means for providing a source of regulated electrical power to the controller;
    field programmable processor means for transferring selected data base information to and receiving status signals from an interface means, digitally executing algorithms respecting said status signals in accordance with computer program routines selected from a library of mnemonically identified routines residing in the read-only memory portion of the processor means and responsively directing programmed data and digital command signals to said interface means;
    interface means for periodically updating the data base of said processor means, analyzing and conditioning signals received from said processor means and from remote data points, and for selectively controlling said remote data points, and;
    operator panel means having information display means, said operator panel means cooperating with said processor means for displaying and adjusting selected system operating parameters and variables.

2. The invention set forth in claim 1 wherein said processor means is capable of continuously executing said algorithms for the selective generation of said command signals in accordance with the solution of said algorithms.

3. The invention set forth in claim 2 wherein said algorithms include control algorithms for mathematically comparing the desired condition of a field datum point with the actual condition of said point, determining the error therebetween and causing the generation of digital command signals affecting the position of field equipment controlling said point.

4. The invention set forth in claim 3 wherein said algorithms further include energy management algorithms causing the coordinated, phased control of said field equipment for reduced energy consumption purposes.

5. The invention set forth in claim 4 wherein said processor means includes master microprocessor means having peripheral microprocessor means coupled thereto for communication therebetween, said master microprocessor means having embodied therein a computer program providing for the selective sensing of signals emanating from said peripheral microprocessor means.

6. The invention set forth in claim 5 wherein said peripheral microprocessor means includes master peripheral processor means and first peripheral processor means, said master peripheral processor means utilizing a communications protocol for providing message communications between said processor means and said interface means, said first peripheral processor means providing message formatting and decoding functions effecting communications between said operator panel means and said processor means.

7. The invention set forth in claim 6 wherein said protocol is of the single master, variable message length, polling type.

8. A system controller capable of digitally executing control and energy management algorithms and comprising:
    field programmable processor means including memory means and a master processor having a predetermined protocol program established therein, and further including a plurality of peripheral processors for receiving signals from said master processor, generating a serial command transmission to a field interface means and permitting data exchange entry and update between said master processor and an operator panel means;
    programmable field interface means for providing message communication between said processor means and field equipment points of analog and binary types;
    operator panel means incorporating keyboard means for permitting an operator to query the status of each of a plurality of functions, to display information regarding said functions and to selectively modify said functions in accordance with a predetermined program;
    power supply means incorporating isolated direct current supply means for providing a source of regulated electrical power to the controller.

9. The invention set forth in claim 8 wherein said field interface means includes analog interface means and binary interface means for interfacing with analog and binary field data points respectively, means for effecting communication between said field interface means and said processor means, internal processing means for controlling and arithmetically processing data received therein and clock signal generating means for synchronizing the exchange of data within said field interface means and between said field interface means and said internal processing means.

10. The invention set forth in claim 9 wherein said analog interface means includes a first group of signal inputs and a second group of signal inputs, each of said groups of inputs being connected to multiplexing means for conversion to first and second signal outputs respectively.

11. The invention set forth in claim 10 wherein input voltage signals occurring over a first range of voltages and being received at said groups of inputs may be conditioned to appear as analog signals having a second voltage range different from said first range.

12. The invention set forth in claim 11 wherein said second voltage range is 0 volts to 5 volts.

13. A system controller for performing heating, ventilating and air conditioning control and energy management functions comprising:
    power supply means for providing a source of regulated electrical power to the controller, said power supply means including isolated direct current supply means for isolating electrical noise;
    processor means incorporating a memory section having a first data base for defining data points and a first group of program routines maintained therein for the generation of control command signals;

field interface means for receiving said control command signals from said processing means, said field interface means having a second group of program routines and a second data base maintained therein, said second data base defining a plurality of field points, said field interface means periodically updating said first data base;

operator panel means coupled to said processor means and including keypad means and luminary numerical and digital display means, said operator means providing control and monitoring communications when said controller is functioning in either a standalone or network coupled mode.

14. The invention set forth in claim 13 wherein said data points are defined by specifying in said first group of program routines the storage locations within said memory section of computed variables utilized by said first group of program routines.

15. The invention set forth in claim 14 wherein said data points comprise points of the binary status and analog value type.

16. The invention set forth in claim 15 wherein each of said data points has status information associated therewith for indicating normality of point operation, reportability of status changes, coincidence of sequentially sampled data point values and current point binary status or analog value.

17. The invention set forth in claim 13 wherein said field points comprise points of the binary input, analog input, binary output and control types.

18. The invention set forth in claim 17 wherein said binary input points comprise points of the contact status, pulse count and pulse rate types and said analog input points comprise points of the limited range, full range, rate input and count totalization types.

19. The invention set forth in claim 17 wherein said binary output points may be connected to field equipment devices of the two state or three state type.

20. The invention set forth in claim 19 wherein said binary output points may be segregated to comprise relay control, actuator and electrical switch points.

21. The invention set forth in claim 17 wherein said control points comprise points of the binary interlock, analog interlock, incremental control and binary output with feedback types.

22. The invention set forth in claim 13 wherein said first group of program routines are of the mnemonically identified user type.

23. A low level system controller for performing distributed data processing, control and energy management functions related to heating, ventilating and air conditioning applications and comprising:

power supply means including an isolated direct current supply section, said power supply means providing a source of regulated electrical power to said controller;

processor means including a master microprocessor and a plurality of peripheral microprocessors for receiving field point status signals, digitally executing control and energy management algorithms and responsively directing digital command signals to a field interface means;

field interface means for analyzing and conditioning signals received therein from said processor means and from remote field equipment points, said field interface means including a data base related to field point definition and downloaded thereto from said processor means;

operator panel means having keypad means and a plurality of illuminated information display means cooperating for selectively displaying and adjusting system operating parameters, and;

field termination means facilitating wiring connection of field equipment to said power supply means, processor means, field interface means and operator panel means.

24. The invention set forth in claim 23 wherein one of said peripheral microprocessors includes a master peripheral processor for receiving command signals from said master microprocessor and for generating a serial transmission of command signals to said field interface means in accordance with a predetermined protocol established by a computer program residing in said master microprocessor.

25. The invention set forth in claim 24 wherein another one of said peripheral microprocessors includes a first peripheral processor for providing data exchange entry and update between said master microprocessor and said operator panel means.

26. The invention set forth in claim 25 wherein another one of said peripheral microprocessors includes a second peripheral processor for facilitating communications between said system controller and a headend unit.

27. The invention set forth in claim 26 wherein said first peripheral processor defines a structural component of said operator panel means.

28. A low level system controller for heating, ventilating and air conditioning applications and including:

a power supply having a line power section and a regulated power assembly for supplying a filtered DC voltage having positive and negative polarities, a transistor network and a circuit for controlling the DC base drive to said network, thereby providing leading edge signal shaping for the minimization of high frequency noise;

said power supply further including a memory supply for providing operating power to a memory regulator and a standby battery for maintaining memory in a data-retaining state;

a processor means including a master processor section, a memory section, a register section, a communications section and a decoder section;

a field interface means coupled to said power supply and to said processor means and including means for interfacing with analog and binary field data points;

an operating panel for providing control and monitoring communications between a human operator and the controller, said operating panel including a first peripheral processor, a first clock buffer section, an address decoder section, a keyboard and a display section.

29. The invention set forth in claim 28 wherein said power supply further includes voltage supplies for providing second DC voltages at positive and negative polarities, means for decoupling input buses to said power supply, means for filtering the output buses of said power supply and a transformer-isolated DC supply section for powering a binary output portion of a field interface means.

30. The invention set forth in claim 29 wherein said power supply further includes a voltage comparator circuit for sensing impending failure of input power and responsively generating a signal indicative thereof.

31. The invention set forth in claim 28 wherein said master processor section includes a first clock generator for providing a master processor clock signal and a second clock generator for providing a signal synchronizing a master processor and a first peripheral processor.

32. The invention set forth in claim 31 wherein said master processor section further includes a second peripheral processor synchronized by said second clock generator and connectible in slave protocol relationship to a headend unit.

33. The invention set forth in claim 32 wherein said signal from said first clock generator is directed to a divider circuit for providing a modem clock signal.

34. The invention set forth in claim 31 wherein said controller further includes a communication interface means arranged in protocol slave relationship to said master processor.

35. The invention set forth in claim 28 wherein analog input signals from field data points are converted to representative digital signals and directed to said processing means and wherein binary signals from said binary field data points may represent any combination of contact status, pulse rate and pulse count signals.

36. The invention set forth in claim 28 wherein said processor means includes a time pulsed reset circuit for forcing a power-on-restart sequence, thereby resetting said processing means to a known state.

37. The invention set forth in claim 36 wherein said field interface means includes a clock generator having a first oscillator for driving a binary interface means and a communication interface means and a second oscillator for providing a clock signal directed to said processor means and to an analog interfacing means.

38. The invention set forth in claim 37 wherein said field interface means includes a circuit for sampling a reference voltage in said analog interface means, thereby providing means for effecting a voltage correction.

39. The invention set forth in claim 28 wherein said operator panel includes a display section having a group of light-emitting diodes for indicating the operating mode and status of said controller, a display for indicating the function being addressed by said operator panel and a display for indicating the value of the addressed function.

40. The invention set forth in claim 39 wherein said operator panel includes means for performing a self-test function.

* * * * *